US009076064B2

(12) United States Patent
Shiiyama et al.

(10) Patent No.: US 9,076,064 B2
(45) Date of Patent: Jul. 7, 2015

(54) IMAGE PROCESSING APPARATUS AND IMAGE PROCESSING METHOD

(71) Applicant: CANON KABUSHIKI KAISHA, Tokyo (JP)

(72) Inventors: Hirotaka Shiiyama, Yokohama (JP); Etsuro Wada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/198,740

(22) Filed: Mar. 6, 2014

(65) Prior Publication Data
US 2014/0254940 A1 Sep. 11, 2014

(30) Foreign Application Priority Data

Mar. 8, 2013 (JP) .................................. 2013-047134
Feb. 10, 2014 (JP) .................................. 2014-023771

(51) Int. Cl.
G06K 9/46 (2006.01)
(52) U.S. Cl.
CPC .................................. G06K 9/4604 (2013.01)
(58) Field of Classification Search
CPC ... G06K 9/00268; G06K 9/46; G06K 9/4604; G06K 9/4638; G06K 9/4671
USPC ......... 382/201, 118, 190, 117, 274, 103, 225, 382/254
See application file for complete search history.

(56) References Cited

U.S. PATENT DOCUMENTS 8,085,996 B2 * 12/2011 Ogawa .......................... 382/118

FOREIGN PATENT DOCUMENTS

| JP | 10-320588 A | 12/1998 |
| JP | 2004-072685 A | 3/2004 |
| JP | 2011-086111 A | 4/2011 |
| JP | 2011-107795 A | 6/2011 |

OTHER PUBLICATIONS

C.Harris, et al., "A Combined Corner and Edge Detector", In Alvey Vision Conference, pp. 147-152,1988.
David G. Lowe, "Distinctive Image Features from Scale-Invariant Keypoints", International Journal of Computer Vision, 60, 2(2004), pp. 91-110.
J. J. Koenderink, et al., "Representation of Local Geometry in the Visual System", Biological Cybernetics, vol. 55, pp. 367-375, 1987.

* cited by examiner

Primary Examiner — Mike Rahmjoo
(74) Attorney, Agent, or Firm — Carter, DeLuca, Farrell & Schmidt, LLP

(57) ABSTRACT

For each of a plurality of second images other than a first image in an image group having a plurality of images, a feature point pair is generated by associating a second feature point of the second image with a first feature point of the first image based on a feature amount of the second feature point. A feature point pair is detected from the generated feature point pairs, where a position of the second feature point in the detected feature point pair is located within a predetermined region. A region including first feature points of the first image is extracted, where in the extracted region, detection counts of the feature point pairs exceed a predetermined threshold.

22 Claims, 22 Drawing Sheets

REFERENCE IMAGE

COMPARISON IMAGE

FIG. 3A

| IMAGE ID | IMAGE DATA FILE NAME | IMAGE FEATURE AMOUNT |
|---|---|---|
| UNIQUE INTEGER VALUE | PATH TO IMAGE DATA | IMAGE FEATURE ID GROUP |

FIG. 3B

| IMAGE FEATURE ID | IMAGE ID | FEATURE POINT COORDINATES | LOCAL FEATURE AMOUNT |
|---|---|---|---|
| UNIQUE INTEGER VALUE | UNIQUE INTEGER VALUE | (x,y) | LOCAL FEATURE VECTOR |

FIG. 3C

| IMAGE OF INTEREST ID | COMPARISON IMAGE ID | IMAGE OF INTEREST FEATURE ID | COMPARISON IMAGE FEATURE ID | DISTANCE BETWEEN FEATURE AMOUNTS |
|---|---|---|---|---|
| UNIQUE INTEGER VALUE | UNIQUE INTEGER VALUE | UNIQUE INTEGER VALUE | UNIQUE INTEGER VALUE | REAL NUMBER |

FIG. 3D

| IMAGE OF INTEREST ID | COMPARISON IMAGE ID | TRANSFORMATION MATRIX M | TRANSFORMATION MATRIX T |
|---|---|---|---|
| UNIQUE INTEGER VALUE | UNIQUE INTEGER VALUE | a,b,c,d | e,f |

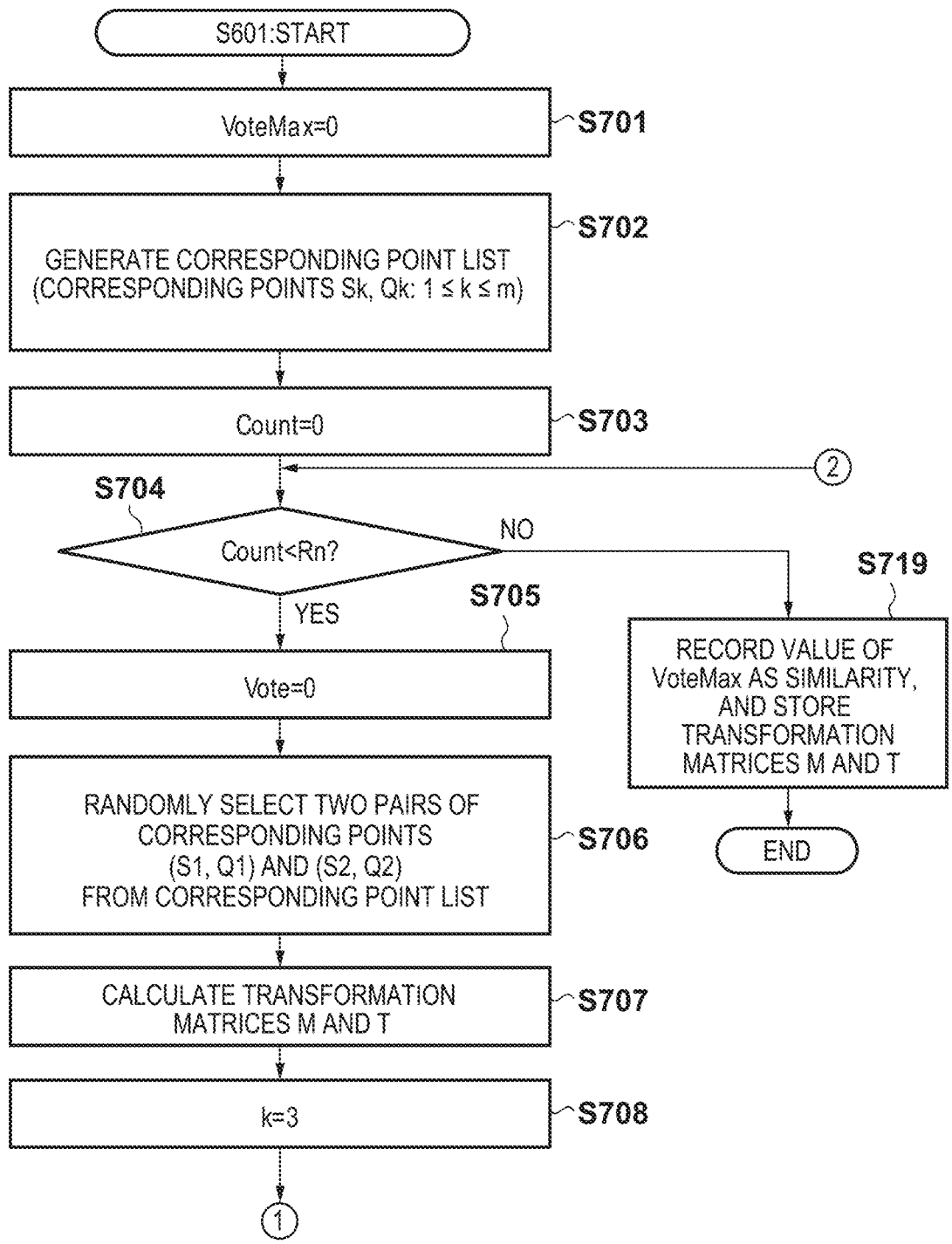

F I G. 8
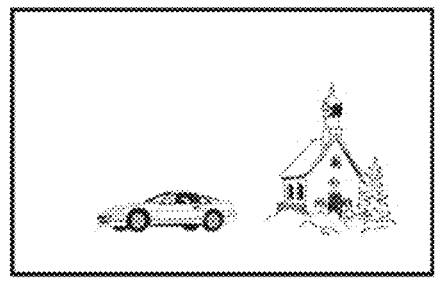
IMAGE ID=1
IMAGE ID=2
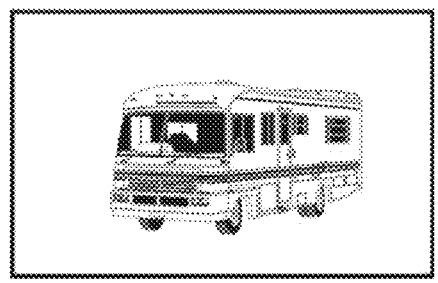
IMAGE ID=3
IMAGE ID=4
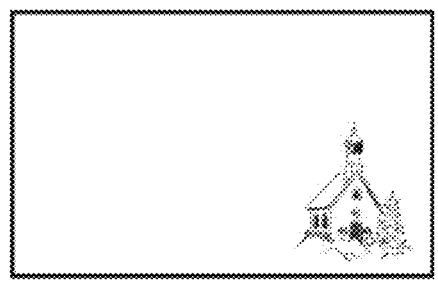
IMAGE ID=5
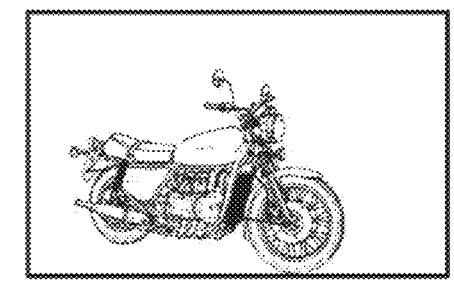
IMAGE ID=6
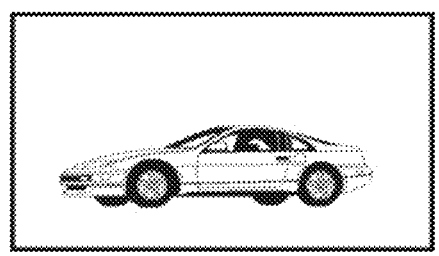
IMAGE ID=7

FIG. 9A

| COMPARISON IMAGE ID / IMAGE OF INTEREST ID | 1 | 2 | 3 | 4 | 5 | 6 | 7 |
|---|---|---|---|---|---|---|---|
| 1 | N/A | 83 | 35 | 85 | 85 | 30 | 80 |
| 2 | 85 | N/A | 45 | 80 | 85 | 20 | 20 |
| 3 | 30 | 40 | N/A | 45 | 40 | 20 | 20 |
| 4 | 90 | 85 | 40 | N/A | 90 | 35 | 25 |
| 5 | 80 | 90 | 45 | 85 | N/A | 30 | 25 |
| 6 | 20 | 30 | 25 | 30 | 30 | N/A | 15 |
| 7 | 80 | 20 | 15 | 20 | 20 | 30 | N/A |

FIG. 9B

| COMPARISON IMAGE ID / IMAGE OF INTEREST ID | 1 | 2 | 3 | 4 | 5 | 6 | 7 |
|---|---|---|---|---|---|---|---|
| 1 | N/A | 83 | 35 | 85 | 85 | 30 | 80 |
| 2 | 85 | N/A | 45 | 80 | 85 | 20 | 20 |
| 3 | 30 | 40 | N/A | 45 | 40 | 20 | 20 |
| 4 | 90 | 85 | 40 | N/A | 90 | 35 | 25 |
| 5 | 80 | 90 | 45 | 85 | N/A | 30 | 25 |
| 6 | 20 | 30 | 25 | 30 | 30 | N/A | 15 |
| 7 | 80 | 20 | 15 | 20 | 20 | 30 | N/A |

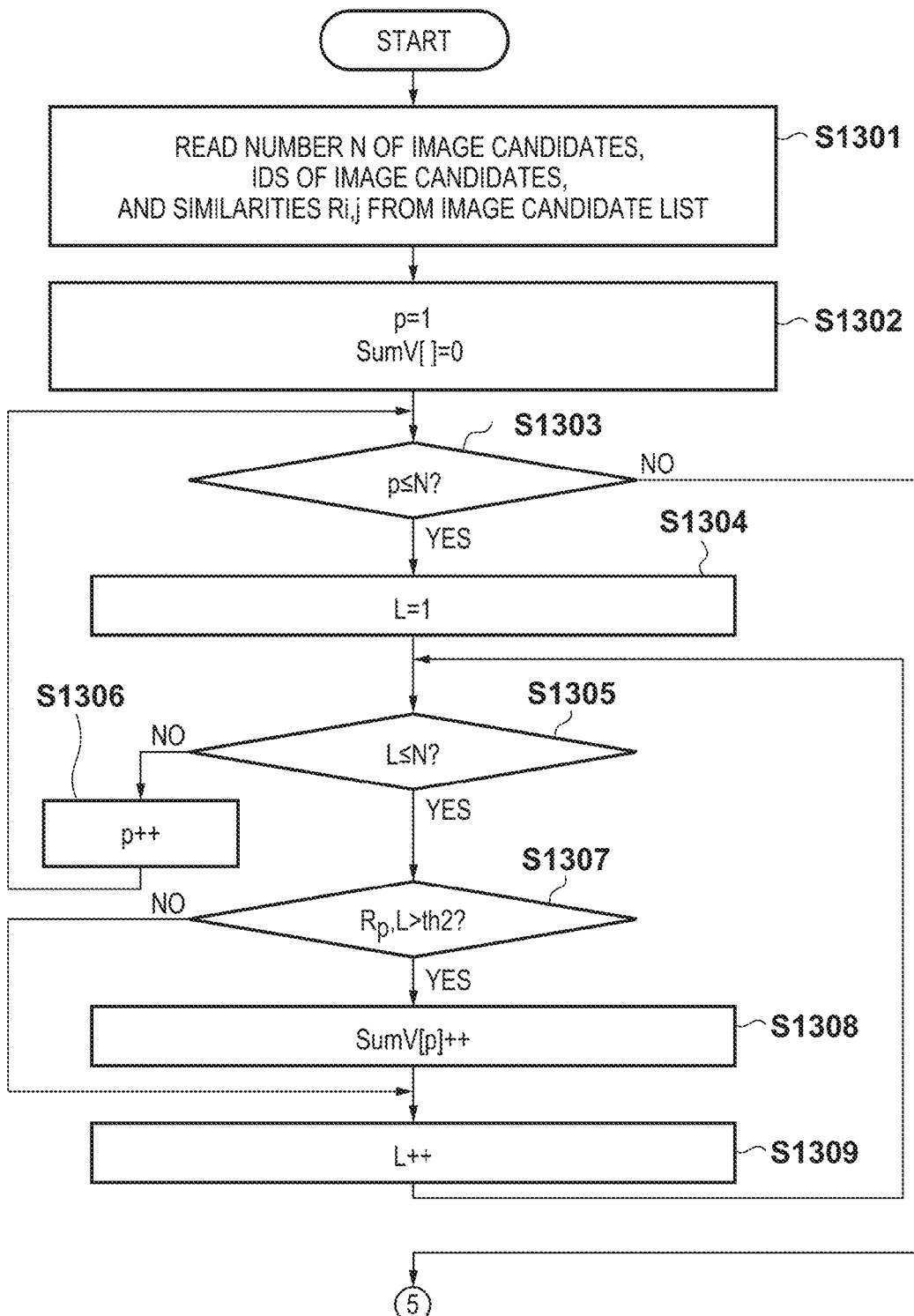
F I G. 13A

REFERENCE IMAGE

COMPARISON IMAGE

IMAGE PROCESSING APPARATUS AND IMAGE PROCESSING METHOD

BACKGROUND OF THE INVENTION

1. Field of the Invention

The present invention relates to image processing for detecting an object region of a principal subject.

2. Description of the Related Art

A technique for searching for similar objects in images using local feature amounts of images is known. In such technique, feature points (to be referred to as "local feature points" hereinafter) are extracted from images. Then, based on the local feature points and image information in the vicinity of these points, local feature amounts corresponding to the local feature points are calculated. A similar object search in images is conducted by matching of local feature amounts.

A local feature amount is generally defined as information including a plurality of elements having a rotation invariance and scaling invariance. Therefore, even for a rotated or enlarged/reduced image, a search using local feature amounts can be conducted. In general, a local feature amount is expressed as a vector. However, a local feature amount has the rotation invariance and scaling invariance theoretically. Hence, in actual digital images, local feature amounts suffer slight variations before and after rotation or enlargement/reduction processing of the images.

In order to extract rotation-invariant local feature amounts, a method of calculating a major direction from a pixel pattern of a local region around local feature points, and rotating the local region with reference to the major direction to normalize a direction upon calculation of local feature amounts has been proposed. Also, in order to calculate scaling-invariant local feature amounts, a method of generating images of different scales inside an apparatus, and performing extraction of local feature points and calculation of local feature amounts from the images of the respective scales has been proposed. A set of a series of images having different scales, which are generated inside the apparatus, is generally called "scale space".

Since it is important to detect a principal subject from an image upon browsing images and for a search using metadata of a principal subject, a function of detecting or discriminating a face in an image is included in products and software in recent years. As for an object expected as an image recognition target like "face" in this case, a subject is recognized from an image to obtain its metadata. Also, an importance level of a subject can be determined by an occupied size of the subject in an image, appearance of the subject, and the like.

Also, in recent years, an environment which allows easy integration of quantatively and qualitatively rich data called big data is beginning to create, and the demand for data mining processing using it is increasing. Even in image data, mining processing can be performed for the aforementioned object which allows the image recognition.

However, a technique for detecting a principal subject from an image is effective for an object expected as an image recognition target, but it is very difficult to detect an object which is not an image recognition target, and it is also difficult to measure an importance level of such object. That is, mining based on big data is applicable to an object which allows image recognition, but is hardly applicable to an object which is not an image recognition target.

A technique for clustering images on a multi-dimensional feature space based on features of the entire image is known. This clustering technique may be applied to mining. However, the clustering technique is based on the similarities of entire images, but it is not based on image contents and, especially, a subject. That is, clustering is made based on features of entire images, and one image belongs to one cluster. Normally, an image includes a plurality of objects, and unique clustering for one image in the clustering technique cannot be adapted for each of the plurality of objects.

In consideration of a plurality of photo images shot by a person or those shot by many people, it is easily estimated that shooting frequencies of subjects which are considered to be important by photographers become high. For example, upon taking pictures of scenic and historic places in travel, photographers normally make a plurality of shooting operations while changing field angles and shooting positions. When pictures of a scenic and historic place of a certain spot are taken by a plurality of persons, it is easily estimated that shooting frequencies for respective objects are related to popularity and topicality. For such estimation, a subject commonly shot in a plurality of images is required to be detected, and a detection technique for this purpose is important for mining of big data, especially, images.

Also, as a technique for detecting an identical object from a plurality of images or videos, a technique for tracing an object in a moving image is known. Also, disparity image processing, panorama stitch processing, and the like for three-dimensional data are known.

The technique for tracing an object is premised on that designated images (frame images) include a common object, and is not a technique for determining whether or not designated images include a common object. For example, since object tracing in a moving image uses image blocks in the vicinity of an object as a feature search target, when a discrete still image sequence or a still image sequence shot from different angles is processed, an object fails to be traced, and a common subject cannot be found.

Also, as for the disparity image processing, since two images having a disparity inevitably includes a common subject, processing for calculating corresponding points within a region range generated by the disparity need only be executed. As for the panorama stitch processing, a common subject is required to be detected for each combination of images if there is no restriction on processing. However, restrictions required to simplify processing and to improve the processing precision (for example, a shooting order is defined) are normally set.

SUMMARY OF THE INVENTION

In one aspect, an image processing apparatus comprising: a calculation unit configured to detect feature points from an image included in a first image group, and to calculate a local feature amount of each feature point using pixels adjacent to the feature point; a comparison unit configured to determine similarity between images based on local feature amounts of the detected feature points for each combination of images included in the first image group; a separation unit configured to separate an image, which is included in the first image group and corresponds to the combination having the similarity not less than a first threshold, as an image of a second image group; a selection unit configured to select a reference image from the second image group based on the similarity of images of the second image group; a detection unit configured to detect, for each feature point of the reference image, a number of images included in the second image group, each of which has a feature point corresponding to the feature point of the reference image, as a number of corresponding images; and an estimation unit configured to estimate an object region based on a distribution of feature points, each of which has the number of corresponding images exceeding a second threshold, in the reference image.

In another aspect, an image processing apparatus comprising: a generation unit configured to generate, for each of a plurality of second images other than a first image in an image group having a plurality of images, a feature point pair by associating a second feature point of the second image with a first feature point of the first image based on a feature amount of the second feature point; a detection unit configured to detect a feature point pair from the generated feature point pairs, wherein a position of the second feature point of the detected feature point pair is located within a predetermined region; and an extraction unit configured to extract a region including first feature points of the first image, wherein in the extracted region, detection counts of the feature point pairs exceed a predetermined threshold.

According to these aspects, an object region of a principal subject can be detected.

Further features of the present invention will become apparent from the following description of exemplary embodiments with reference to the attached drawings.

BRIEF DESCRIPTION OF THE DRAWINGS

FIGS. 3A to 3D are tables showing data schema examples.

FIGS. 7A and 7B are flowcharts showing similarity comparison processing.

FIG. 8 is a view showing examples of detection target images.

FIGS. 9A and 9B are tables showing similarity comparison processing results for the detection target images shown in FIG. 8.

FIGS. 13A and 13B are flowcharts showing image candidate narrowing down processing according to the second embodiment.

DESCRIPTION OF THE EMBODIMENTS

Embodiments of the present invention will be described hereinafter with reference to the drawings. Note that the following embodiments do not limit the present invention related to the scope of the claims, and all of combinations of features described as embodiments are not always indispensable for solutions in the present invention.

First Embodiment

In an embodiment, the following processing is executed to detect a more frequently shot subject in a first image group as a principal subject. Note that the subject to be detected is not always included in all images of the first image group.

Local feature points are detected from respective images included in the first image group, and local feature amounts of the local feature points are calculated using pixels adjacent to the local feature points. Next, the local feature amounts are compared to each combination of images included in the first image group to calculate a similarity between these images. Images corresponding to combinations, similarities of which exceed a first threshold, are separated as a second image group. Next, one image included in the second image group is used as a reference image, and local feature amounts with local feature points of other images in the second image group are compared for respective local feature points of the reference image, thus calculating distances between the local feature amounts. Next, the number of images (to be referred to as the "number of corresponding images" hereinafter) including local feature points, distances of which are not more than a second threshold, is detected for respective local feature points of the reference image. Then, a region of the reference image, which includes feature points, the number of corresponding images of which exceeds a third threshold, is detected as an object region of a principal subject.

The arrangement of this embodiment which performs such object detection processing will be described in detail below.

[Arrangement of Apparatus]

Figure 1:
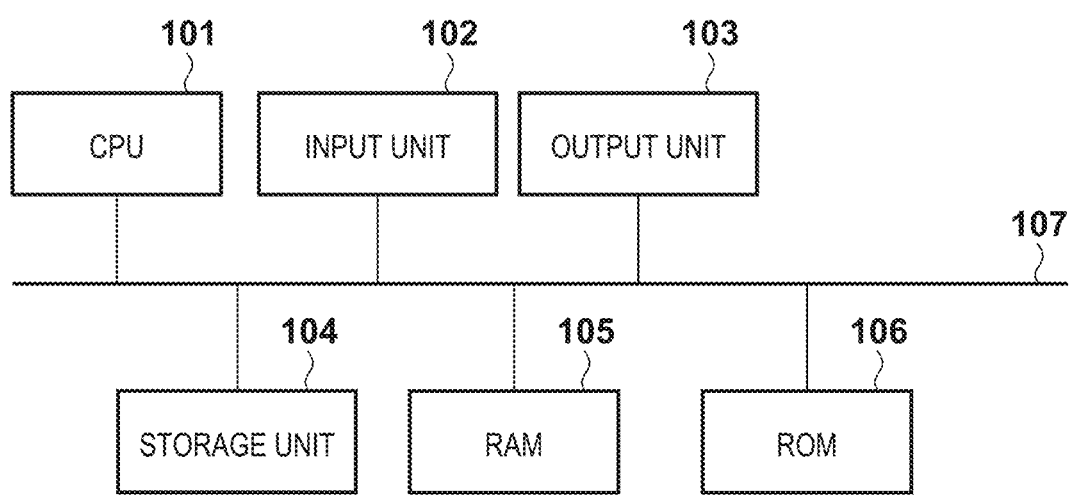
FIG. 1 is a block diagram showing the arrangement of an image processing apparatus according to an embodiment.

FIG. 1 shows the arrangement of an image processing apparatus which executes object detection processing according to the first embodiment.

A microprocessor (CPU) 101 executes mathematical operations, logical operations, judgments, and the like for various kinds of data processing, thereby controlling respective units connected through a system bus 107. To an input unit 102, a keyboard or pointing device used to input user instructions, an image capturing device such as a camera used to input detection target images of a principal subject, or a recording medium such as a memory card used to hold shot images is connected. To an output unit 103, various display devices such as a liquid crystal panel are connected.

A storage unit 104 is a hard disk drive, flash memory, or the like, which stores various kinds of information such as input/output data and processing programs. A random access memory (RAM) 105 is used as a work memory of the CPU 101, and temporarily stores data from respective units and intermediate operation data. A read only memory (ROM) 106 stores an operating system and control programs to be executed by the CPU 101. All of the aforementioned units are connected to each other through the system bus 107.

Figure 2:
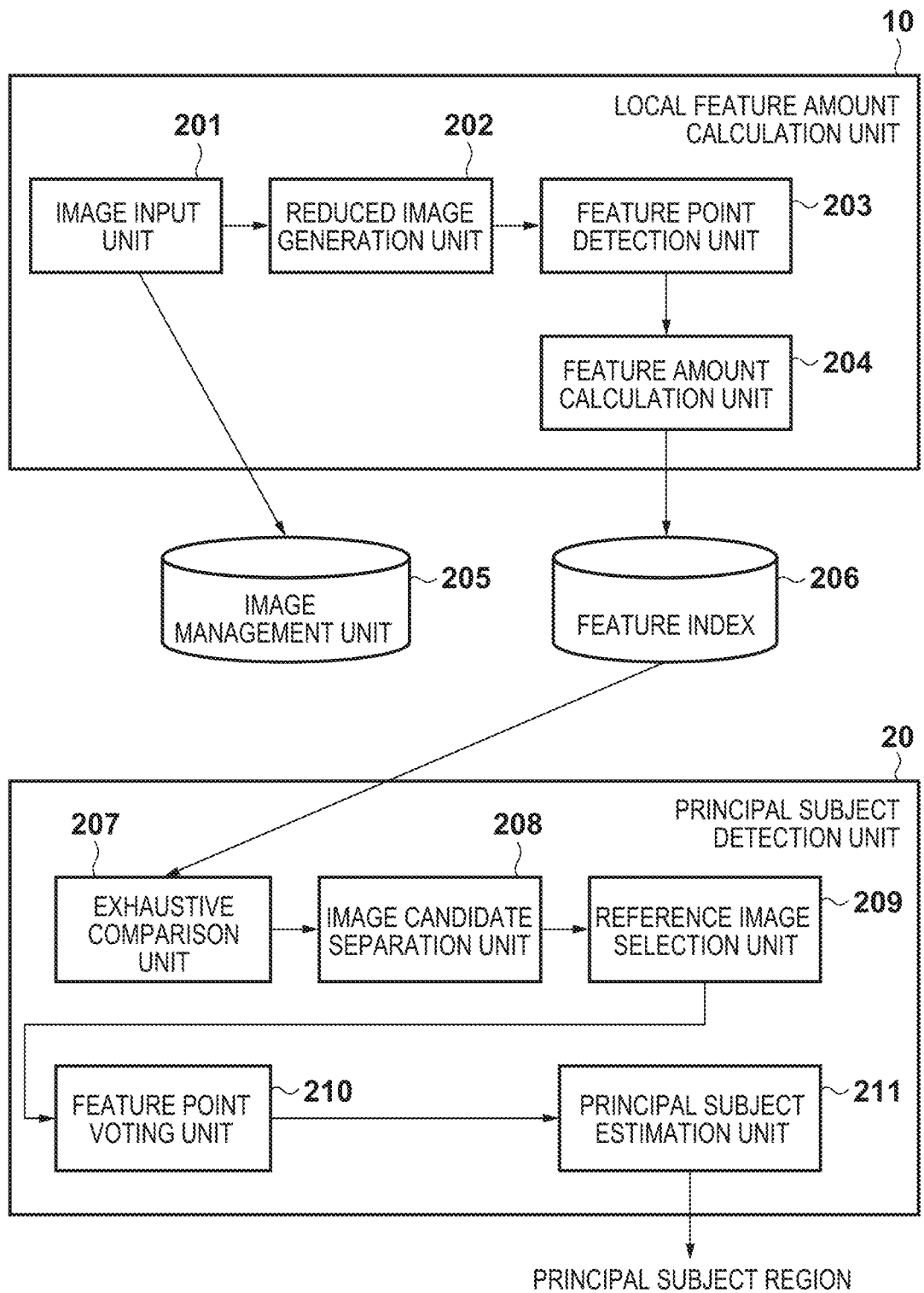
FIG. 2 is a block diagram showing the arrangement of an object detection processing unit according to the first embodiment.

FIG. 2 is a block diagram showing the arrangement of an object detection processing unit in the image processing apparatus according to the embodiment. The object detection processing unit shown in FIG. 2 is implemented when the CPU 101 executes an object detection processing program stored in the storage unit 104 or the like.

The processing arrangement of the object detection processing is roughly classified into a local feature amount calculation unit 10 and principal subject detection unit 20. Feature information acquired from an image by the local feature amount calculation unit 10 is stored in, for example, a feature index 206 allocated in a predetermined area of the RAM 105. The principal subject detection unit 20 detects an object of a principal subject by reading out feature information from the feature index 206.

Images as detection targets (to be referred to as "detection target images" hereinafter) of a principal subject, which are input by the input unit 102, are stored in, for example, a predetermined area of the storage unit 104 by an image management unit 205.

[Local Feature Amount Calculation Unit]

Processing for detecting local feature points from detection target images and calculating local feature amounts each having a rotation invariance and scaling invariance in association with the local feature points in the local feature amount calculation unit 10 will be described below.

An image input unit 201 inputs detection target images. A reduced image generation unit 202 generates reduced images of the detection target images. A feature point detection unit 203 detects local feature points from reduced images. A feature amount calculation unit 204 calculates local feature amounts of local feature points using the local feature points and adjacent pixels of the local feature points, and stores feature information indicating the local feature amounts of the local feature points in the feature index 206.

In general object detection processing, coordinates of local feature points of a comparison target image and local feature amounts (feature information) are calculated in advance, and the calculated feature information is registered in the feature index in association with the comparison target image. Then, in the object detection processing, the feature information of the comparison target images is sequentially read out from the feature index, and is compared with those of detection target images, thus obtaining a detection result by sorting comparison results in descending order of similarity.

Feature Index

Data schemata according to the embodiment will be described below with reference to FIGS. 3A to 3D.

FIG. 3A shows an example of an image management index of the image management unit 205. The image management unit 205 assigns a unique image ID (integer value) to each detection target image, and holds link information required to manage the detection target image and local feature amounts in association with the image ID. A search hit result is expressed as a pair of this image ID and a similarity. An "image data file name" field of the image management index stores a file name including a path to a storage destination of each detection target image. Also, an "image feature amount" field stores an image feature ID group required to link to an image feature index used to manage calculation results of the local feature amounts shown in FIG. 3B. In order to store the image feature ID group, the "image feature amount" field has a variable length.

FIG. 3B shows an example of the image feature index which describes a local feature amount of an image of interest indicated by each image ID. The image feature index records a local feature amount corresponding to one local feature point as one record. That is, the image feature index records, for each local feature point indicated by an "image feature ID", an "image ID" of an image to which the local feature point belongs, "feature point coordinates" of the local feature point, and a "local feature amount" as a vector expression of the local feature point, as shown in FIG. 3B.

Local Feature Amount Calculation Processing

Figure 4:
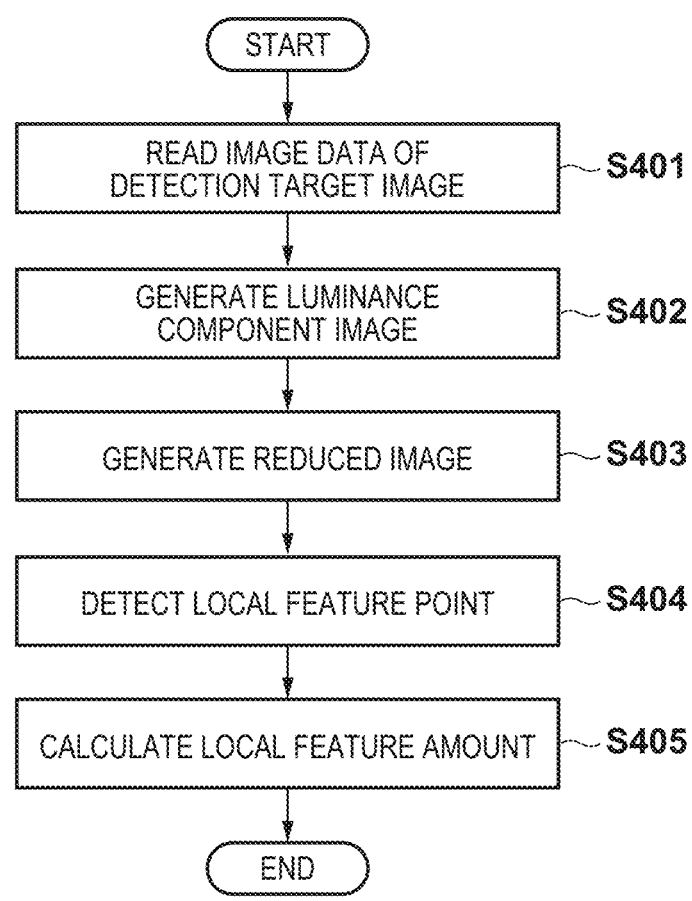
FIG. 4 is a flowchart showing local feature amount calculation processing.

The local feature amount calculation processing of this embodiment will be described below with reference to the flowchart shown in FIG. 4.

The image input unit 201 reads image data of a detection target image, and the image management unit 205 stores the detection target image in a predetermined area of the storage unit 104 (S401). The image input unit 201 generates a luminance component image by extracting luminance components from the image data of the detection target image, and outputs the luminance component image to the reduced image generation unit 202 (S402).

The reduced image generation unit 202 sequentially reduces the luminance component image input from the image input unit 201 according to a magnification p to generate the integer number n of reduced images, and outputs them to the feature point detection unit 203 (S403). Note that the magnification p and the number n of reduced images are determined in advance.

Figure 5:
FIG. 5 is a view showing a generation example of reduced images.

FIG. 5 shows a generation example of reduced images in the reduced image generation unit 202. FIG. 5 shows an example in which the magnification p is $2^{-1/4}$ and the number n of reduced image is 9. Of course, the magnification p and the number n of images may assume other numerical values. In FIG. 5, an image 501 is a luminance component image (to be referred to as an "original image" hereinafter) input from the image input unit 201. A reduced image 502 is an image obtained by reducing the original image four times according to the magnification p, and a reduced image 503 is an image obtained by reducing the original image eight times according to the magnification p. In the example of FIG. 5, the reduced image 502 is a ½ reduced image of the original image 501, and the reduced image 503 is a ¼ reduced image of the original image 501. Note that the reduction image generation unit 202 performs reduction based on, for example, linear interpolation, but this reduction method is not particularly limited.

Next, the feature point detection unit 203 detects local feature points, which can be robustly detected even when an image is rotated, using the n reduced images input from the reduced image generation unit 202 (S404). Note that local feature points are detected as points on the original image 501.

Assume that this embodiment uses a Harris operator as the local feature point detection method. In association with a pixel of interest on an output image H obtained by applying the Harris operator, pixel values of the pixel of interest and eight adjacent pixels of the pixel of interest (a total of nine pixels) are checked. Then, a point at which a pixel of interest is locally maximum (a pixel value of the pixel of interest is maximum in the nine pixels) is detected as a local feature point. However, even when a pixel of interest is locally maximum, if a value of the pixel of interest is not more than a predetermined threshold, the pixel of interest is not detected as a local feature point. Note that refer to [C. Harris and M. J. Stephens, "A COMBINED CORNER AND EDGE DETECTOR", In Proc. of Fourth Alvey Vision Conference, pp. 147-152, 1988] for further details of local feature point detection using the Harris operator. Also, the feature point detection method is not limited to that using the Harris operator, and any other methods can be applied as long as a local feature point can be detected. The detected local feature points are input to the feature amount calculation unit 204.

The feature amount calculation unit 204 calculates a local feature amount, which is defined to be rotation-invariant and scale-invariant, in association with each local feature point input from the feature point detection unit 203 (S405). Assume that this embodiment uses combinations of Local Jets and their derivatives as a local feature amount calculation method. That is, a local feature amount v is calculated by:

$$v = \begin{pmatrix} L \\ L_x L_x + L_y L_y \\ L_{xx} L_x L_x + 2L_{xy} L_x L_y + L_{yy} L_y L_y \\ L_{xx} + L_{yy} \\ L_{xx} L_{xx} + 2L_{xy} L_{xy} + L_{yy} L_{yy} \end{pmatrix} \quad (1)$$

Symbols used in the right-hand side in equation (1) are respectively defined by:

$$L = G(x,y) * I(x,y) \quad (2)$$

$$L_x = \partial L/\partial x \quad (3)$$

$$L_y = \partial L/\partial y \quad (4)$$

$$L_y = \partial^2 L/\partial x \partial y \quad (5)$$

$$L_{xx} = \partial^2 L/\partial x^2 \quad (6)$$

$$L_{yy} = \partial^2 L/\partial y^2 \quad (7)$$

Note that in equation (2), G(x, y) in the right-hand side is a Gaussian function, I(x, y) is a pixel value at coordinates (x, y) of an image, and "*" represents a convolution operation. Also, equation (3) is a partial derivative related to x of a variable L defined by equation (2), and equation (4) is a partial derivative related to y of the variable L. Equation (5) is a partial derivative related to y of a variable Lx defined by equation (3), equation (6) is a partial derivative related to x of the variable Lx defined by equation (3), and equation (7) is a partial derivative related to y of Ly defined by equation (4).

Refer to [J. J. Koenderink and A. J. van Doorn, "Representation of local geometry in the visual system", Biological Cybernetics, vol. 55, pp. 367-375, 1987] for further details of local feature amount calculations using Local Jets.

Note that the feature amount calculation method is not limited to that using Local Jets, and any other methods can be applied as long as a local feature amount having a rotation invariance and scale invariance can be calculated. The calculated local feature amount is associated with coordinates of a local feature point, and is stored in the feature index 206 as a pair of the local feature amount and coordinates of a local feature point. That is, the feature index 206 stores a plurality of pairs of local feature amounts and coordinates of local feature points for each detection target image.

[Principal Subject Detection Unit]

Processing executed when the principal subject detection unit 20 reads out feature information from the feature index 206 and detects an object of a principal subject will be described. An overview of processing will be described first with reference to the flowchart shown in FIG. 6, and details of respective processes will then be described.

An exhaustive comparison unit 207 selects an image of interest from detection target images (first image group), and executes similarity comparison between the image of interest and all detection target images except for the image of interest (S601). This comparison processing is executed for all combinations (or pairs) of images of the first image group, thus obtaining, as similarities, information indicating as to whether or not images include a similar part, in other words, information indicating possibility of the presence of a subject, an image of which is commonly shot in respective combinations of the images of the first image group.

An image candidate separation unit 208 separates images corresponding to combinations having similarities, which are not less than a predetermined threshold, of the first image group as a second image group (S602). In other words, candidates of images including a principal subject are selected as the second image group. A reference image selection unit 209 selects, as a reference image, an image which includes a most preferable shot of the subject common to the second image group from the second image group (S603), as will be described in detail later. In this case, images including an object common to the second image group are extracted as a third image group, as will be described in detail later.

A feature point voting unit 210 accumulates, for each local feature point, numbers of local feature points of the reference image, which match those of the images of the third image group (S604). A principal subject estimation unit 211 detects a region including local feature points, the accumulated numbers of which are not less than a predetermined threshold, as an object region of the principal subject (S605).

The respective processes shown in the flowchart of FIG. 6 will be described in detail below.

Exhaustive Comparison Unit

The similarity comparison processing (S601) by the exhaustive comparison unit 207 will be described in detail below with reference to the flowcharts shown in FIGS. 7A and 7B.

Figure 7B:
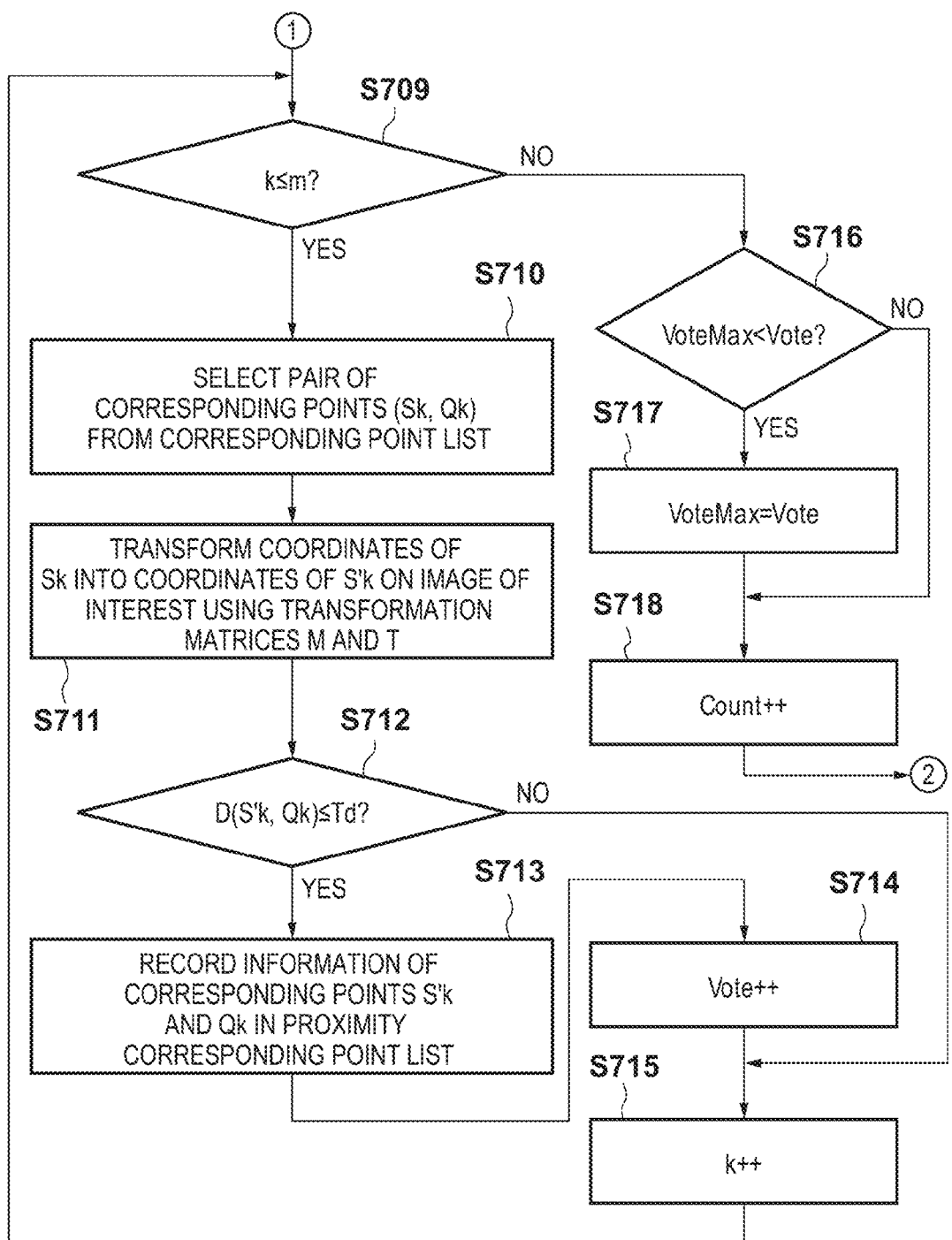

FIGS. 7A and 7B show the similarity comparison processing in a pair of a certain image of interest and certain comparison image, and this comparison processing is executed for all the pairs of images of the first image group. Let Vq be a local feature amount of an image of interest, Q be a local feature point associated with the local feature amount Vq, and Q(x', y') be coordinates of that local feature point. Also, let Vs be a local feature amount of the comparison image, S be a local feature point associated with that local feature amount Vs, and S(x, y) be coordinates of that local feature point.

The exhaustive comparison unit 207 initializes a variable VoteMax indicating the final number of votes to zero (S701). Next, the exhaustive comparison unit 207 calculates a distance between the local feature amounts Vq and Vs (to be referred to as a "distance between feature amounts" hereinafter) for all combinations of the local feature amounts, and generates a list of corresponding points (to be referred to as a "corresponding point list" hereinafter) which correspond to shortest distances between feature amounts (S702).

Since each feature amount is expressed by rotation-invariant and scaling-invariant vectors, the distance between feature amounts can be obtained by calculating their difference. That is, a local feature amount Vs corresponding to a calculated distance between feature amounts which is not more than a threshold Tv and is shortest, with respect to the local feature amount Vq of the image of interest, is detected as a local feature amount of a corresponding point, and a combination of these local feature amounts Vq and Vs is registered in the corresponding point list. Of course, if no local feature amount Vs, which satisfies the aforementioned condition with respect to the local feature amount Vq, exists, that local feature amount Vq is not registered in the corresponding point list.

FIG. 3C shows a schema of the corresponding point list. As shown in FIG. 3C, the corresponding point list records "image of interest feature ID" indicating a local feature amount of an image of "image of interest ID", "comparison image feature ID" indicating a local feature amount of an image of "comparison image ID", and "distance between feature amounts" obtained by comparing the local feature amounts between these two images.

In the following description, for the k-th corresponding point registered in the corresponding point list, let Vq(k) be a local feature amount of the image of interest of that corresponding point, and Vs(k) be a local feature amount of the comparison image of that corresponding point. Furthermore, let Qk and Sk respectively be local feature points associated with the local feature amounts Vq(k) and Vs(k), and Qk(x'$_k$, y'$_k$) and Sk(x$_k$, y$_k$) be coordinates of these points. Also, let m be the number of corresponding points registered in the corresponding point list (to be referred to as the "number of registered corresponding points" hereinafter) (1≤k≤m).

Next, the exhaustive comparison unit 207 initializes a variable Count indicating a repetition count value of the similarity calculation processing to zero (S703), and compares the repetition count value Count and a predetermined maximum repetition processing count Rn (S704). If Count<Rn, the exhaustive comparison unit 207 initializes a variable Vote indicating the number of votes to zero (S705).

Next, the exhaustive comparison unit 207 randomly selects two pairs of corresponding points from the corresponding point list (S706). Let Q1(x'$_1$, y'$_1$) and S1(x$_1$, y$_1$), and Q2(x'$_2$, y'$_2$) and S2(x$_2$, y$_2$) be coordinates of the two pairs of corresponding points selected in this step. Then, under the assumption that the coordinates Q1(x'$_1$, y'$_1$) and S1(x$_1$, y$_1$), and Q2(x'$_2$, y'$_2$) and S2(x$_2$, y$_2$) satisfy transformation given by:

$$\begin{pmatrix} x'_k \\ y'_k \end{pmatrix} = \begin{pmatrix} a & b \\ c & d \end{pmatrix} \begin{pmatrix} x_k \\ y_k \end{pmatrix} + \begin{pmatrix} e \\ f \end{pmatrix} \quad (8)$$

variables $\underline{a}$ to f in equation (8) are calculated (S707). That is, a transformation matrix M including variables $\underline{a}$ to d and a transformation matrix T including variables e to f are calculated.

Note that when only homothetic transformation is taken into consideration for the sake of simplicity, equation (8) can be rewritten as:

$$\begin{pmatrix} x'_k \\ y'_k \end{pmatrix} = \begin{pmatrix} a & -b \\ b & a \end{pmatrix} \begin{pmatrix} x_k \\ y_k \end{pmatrix} + \begin{pmatrix} e \\ f \end{pmatrix} \quad (9)$$

The variables $\underline{a}$, b, e, and f in equation (9) are expressed, using coordinate values x'$_1$, y'$_1$, x$_1$, y$_1$, x'$_2$, y'$_2$, x$_2$, and y$_2$, by:

$$a = \{(x_1-x_2)(x'_1-x'_2) + (y_1-y_2)(y'_1-y'_2)\}/XY \quad (10)$$

$$b = \{(x_1-x_2)(y'_1-y'_2) - (y_1-y_2)(x'_1-x'_2)\}/XY \quad (11)$$

$$e = \{(y'_1-y'_2)(x_1y_2-x_2y_1) - (x'_1+x'_2)(x_1x_2+y_1y_2) + x'_1(x_2^2+y_2^2) + x'_2(x_1^2+y_1^2)\}/XY \quad (12)$$

$$f = \{(x'_1-x'_2)(y_1x_2-y_2x_1) - (y'_1+y'_2)(y_1y_2+x_1x_2) + y'_1(y_2^2+x_2^2) + y'_2(y_1^2+x_1^2)\}/XY \quad (13)$$

for XY=(x$_1$-x$_2$)+(y$_1$-y$_2$)$^2$

Next, the exhaustive comparison unit 207 sets "3" in a selection variable k so as to select corresponding points other than the two pairs of corresponding points randomly selected from the corresponding point list (S708), and compares the selection variable k and the number m of registered corresponding points (S709). Then, if k>m, the process advances to step S716, and the processing in this case will be described later.

If k≤m, the exhaustive comparison unit 207 selects a pair of corresponding points Qk and Sk (coordinates Qk(x$_k$, y$_k$) and Sk(x$_k$, y$_k$)) other than the two pairs of corresponding points selected in step S706 (S710).

Next, the exhaustive comparison unit 207 calculates coordinates S'k(x'$_k$, y'$_k$) by transforming the coordinates Sk(x$_k$, y$_K$) of the local feature point Sk of the comparison image into those on the image of interest using equation (9) (using the transformation matrices M and T) (S711). Then, the exhaustive comparison unit 207 calculates a geometric distance (Euclidean distance D(S'k, Qk)) between the transformed coordinates S'k(x'$_k$, y'$_k$) and the coordinates Qk(x$_k$, y$_k$) of the local feature point Qk of the image of interest, and determines the Euclidean distance D(S'k, Qk) is not more than a predetermined threshold Td (S712).

If D(S'k, Qk)≤Td, the exhaustive comparison unit 207 records information of the corresponding points Qk(x$_k$, y$_k$) and S'k(x'$_k$, y'$_k$) in the two images in a proximity corresponding point list (S713), increments the variable Vote (S714), and advances the process to step S715. On the other hand, if the Euclidean distance D(S'k, Qk) is larger than the threshold Td, the exhaustive comparison unit 207 advances the process to step S715 without any processing.

By recording the information of the corresponding points of the two images in the proximity corresponding point list, similar feature voting processing (accumulations of matching feature points) in step S604 in the subsequent stage can be simplified. Note that the proximity corresponding point list can be allocated on the RAM 105 or the like using the same schema as that of the corresponding point list shown in FIG. 3C.

The exhaustive comparison unit 207 increments the selection variable k (S715), and returns the process to step S709. That is, the processes of steps S710 to S715 are repeated until the selection variable k exceeds the number m of registered corresponding points, and if the selection variable k exceeds the number m of corresponding points, the process advances to step S716.

If k>m, the exhaustive comparison unit 207 compares the variable Vote indicating the number of votes and the variable VoteMax indicating the final number of votes (S716). If Vote>VoteMax, the exhaustive comparison unit 207 replaces the value of VoteMax by that of Vote (S717). After that, the exhaustive comparison unit 207 increments the repetition count value Count (S718), and returns the process to step S704. On the other hand, if Vote≤VoteMax, the exhaustive comparison unit 207 increments the repetition count value Count without updating VoteMax (S718), and returns the process to step S704.

If the repetition count value Count exceeds the predetermined maximum repetition processing count Rn in step S704, the exhaustive comparison unit 207 records the value of the variable VoteMax as a similarity of the image of interest with respect to the comparison image in a predetermined area of the RAM 105 (S719), thus ending the similarity comparison processing. In step S719, the exhaustive comparison unit 207 stores the transformation matrices M and T at the end timing of the similarity comparison processing in a predetermined area of the RAM 105 using a transformation matrix holding schema shown in FIG. 3D. That is, at the end timing of the similarity comparison processing, the transformation matrices M and T associated with the image IDs of the image of interest and comparison image are stored as transformation matrix information.

In the aforementioned example of the similarity comparison processing, only homothetic transformation for corresponding points are taken into consideration. However, other geometric transformations such as affine transformation may be used. In this case, transformation matrices can be calculated according to other geometric transformation methods in step S707. For example, in case of affine transformation, three pairs of corresponding points are randomly extracted in step S706. Then, in step S707, variables $\underline{a}$ to f can be calculated in step S707 using equation (8) in place of equation (9) and the three pairs of corresponding points (a total of six points).

Also, in the aforementioned example, the value of the variable VoteMax indicating the final number of votes is output as the similarity in step S719. However, the present invention is not limited to this, and indices of other similarities may be calculated. For example, the processes in step S703 and subsequent steps may be skipped, and the number m of registered corresponding points of the corresponding point list generated in step S702 may be output intact as an index of a similarity. In this case, the search speed can be improved while maintaining predetermined search precision.

The exhaustive comparison unit 207 applies the similarity comparison processing shown in the flowcharts of FIGS. 7A and 7B to all images of the first image group except for the image of interest while sequentially switching the comparison image, thus obtaining exhaustive comparison processing results for all the images.

The comparison processing results of the exhaustive comparison unit 207 will be described below with reference to FIG. 8 and FIGS. 9A and 9B. FIG. 8 shows examples of seven detection target images of image IDs=1 to 7, and FIG. 9A shows the exhaustive comparison processing results for these seven detection target images. FIG. 9A shows similarities of images of interest with respect to comparison images. Note that since comparison for identical images is skipped, no values are recorded on a diagonal line of a table shown in FIG. 9A. In FIG. 9A, for images of IDs=1, 2, 4, and 5 including an object "church" as a common subject, each other's similarities are high (80 or higher). Likewise, for images of IDs=1 and 7 including an object "car" as a common subject, each other's similarities are high (80 or higher).

Note that in FIG. 9A, the similarity comparison results of the images of interest and comparison images have no symmetry. This is because the similarity comparison processing of this embodiment is based on RANSAC (random sample consensus) processing for randomly extracting some samples, and the symmetry cannot be expected. Also, the symmetry cannot be expected when the number m of registered corresponding points of the corresponding point list is used as an index of a similarity.

Also, similarity comparison processing using minimum required combinations of an image of interest and comparison images may be executed in consideration of images in which tendencies of image features are considered to be similar. In this case, the processing speed can be improved.

Image Candidate Separation Unit

The separation processing of the second image group by the image candidate separation unit 208 (S602) will be described in detail below.

By the second image group separation processing, images having similarities, which are not less than a predetermined threshold Ts, are selected as candidates of images including a principal subject, and pieces of information indicating the selected images are registered in, for example, an image candidate list allocated to a predetermined area of the RAM 105. That is, when a similarity between images is not less than the threshold Ts, both of the two images, the similarity of which is calculated, are selected, and are registered in the image candidate list. FIG. 9B shows image candidate selection results when the threshold Ts=80 for the exhaustive similarity comparison processing results in the image group shown in FIG. 8. In the example of FIG. 9B, hatched parts are similarities of 80 or higher, and images of the IDs=1, 2, 4, 5, and 7 are registered in the image candidate list.

Also, it is effective to further examine in detail and narrow down the image candidate selection results. For example, in the example shown in FIG. 8, the image of the ID=1 includes two objects "church" and "car", the image of the ID=7 includes only an object "car", and the images of the IDs=2, 4, and 5 includes only an object "church". Since the images of the ID=1 and ID=7 commonly includes the object "car", their similarity is 80, and reaches the threshold Ts. However, the similarities between the images of the IDs=2, 4, and 5, which have high similarities with the image of the ID=1, and the image of the ID=7 is less than the threshold Ts since they do not include any common object. On the other hand, since the images of the IDs=1, 2, 4, and 5 commonly include the object "church", they mutually have similarities not less than the threshold Ts.

In the example shown in FIG. 8, in step S602, the images of the IDs=1, 2, 4, 5, and 7 are selected as image candidates. However, as image candidates including a common object, the images of the IDs=1, 2, 4, and 5 are desirably selected by excluding the image of the ID=7. This further selection of the image candidates is executed in the subsequent reference image selection processing.

Reference Image Selection Unit

Next, the reference image selection processing by the reference image selection unit 209 (S603) will be described in detail below with reference to the flowcharts shown in FIGS. 10A and 10B. In this case, the image IDs of N image candidates, which have similarities not less than the threshold Ts and are registered in the image candidate list in step S602, will be described as ID[i](i=1, 2, 3, ..., N).

The reference image selection unit 209 reads the number N of image candidates and the IDs of the respective image candidates, and similarities $R_{i,j}$ between image candidates of ID[i] and ID[j](i≠j) from the image candidate list (S1001). Next, the reference image selection unit 209 initializes a counter p required to identify an image candidate of interest to "1", and initializes an accumulated similarity Sum[p](p=1, 2, 3, ..., N), which represents the sum total of similarities with other image candidates, to zero (S1002).

Next, the reference image selection unit 209 determines whether or not the counter p exceeds the number N of candidates (S1003). If the counter p does not exceed the number N of candidates, the reference image selection unit 209 initializes a counter L to "1" (S1004). The counter L is used to express an image candidate upon calculation of the accumulated similarity Sum[p]. Then, the reference image selection unit 209 determines whether or not image candidates as accumulation targets of similarities remain (S1005). If image candidates remain, the reference image selection unit 209 cumulatively adds the similarity $R_{p,L}$ between the image candidate ID[p] of interest and image candidate ID[L] as an accumulation target (S1007), increments the counter L (S1008), and returns the process to step S1005.

In this manner, cumulative additions of the similarities $R_{p,L}$ between the image candidate ID[p] of interest indicated by the counter p and other image candidates ID[L] are done in the loop of steps S1005 to S1008. Then, if the counter L reaches the number N of candidates in step S1005, the reference image selection unit 209 increments the counter p (S1006), and returns the process to step S1003.

The processes of steps S1003 to S1008 are repeated until p>N in step S1003, that is, for all the image candidates, and an accumulated similarity Sum[i] is calculated for all the image candidates.

If p>N in step S1003, the reference image selection unit 209 performs selection of a reference image used upon detection of a principal subject and deletion of image candidates which are unlikely to include a principal subject. In other words, the reference image selection unit 209 extracts images of the third image group including the principal subject form those of the second image group selected as image candidates in step S602.

Initially, the reference image selection unit 209 performs various initializations (S1009). That is, the reference image selection unit 209 initializes the counter p which represents an image candidate of interest to "1", Ref_ID which represents a reference image to "1", and a maximum accumulated similarity Rmax of the reference image to zero. Furthermore, the reference image selection unit 209 initializes the number Ncandi of image candidates including the principal subject to the total number N of image candidates. Ncandi is decremented when an image candidate which is unlikely to include the principal subject is determined.

Next, the reference image selection unit 209 determines whether or not the counter p exceeds the number N of candidates (S1010). If the counter p does not exceed the number N of candidates, the reference image selection unit 209 compares the accumulated similarity Sum[p] of the image candidate of interest and the current maximum accumulated similarity Rmax (S1011). As a result of comparison, if Sum[p] ≥Rmax, the reference image selection unit 209 updates Rmax to Sum[p] by setting the value of the counter p indicating the image candidate of interest in Ref_ID indicating the reference image (S1012). After that, the counter p is incremented to select the next image candidate as the image candidate of interest (S1015), and the process returns to step S1010.

On the other hand, if Sum[p]<Rmax, the reference image selection unit 209 determines whether or not an average similarity $Rp_{ave}$ per image candidate obtained by dividing the accumulated similarity Sum[p] by the number N of candidates is less than a predetermined threshold th1 (S1013).

The average similarity $Rp_{ave}$ of the image candidate of interest indicates the percentage of similar corresponding points of all the corresponding points in the image candidates. For example, if th1=60 and $Rp_{ave}$<th1, it is determined that similar corresponding points are less than 60%, and the reference image selection unit 209 deletes the image candidate of interest from the image candidate list, and decrements the number Ncandi of image candidates (S1014). After, that, the counter p is incremented to select the next image candidate as the image candidate of interest (S1015), and the process returns to step S1010.

If it is determined in step S1013 that $Rp_{ave}$≥th1, the reference image selection unit 209 does not delete the image candidate of interest, and increments the counter p to select the next image candidate as the image candidate of interest (S1015). Then, the process returns to step S1010.

Then, if p>N in step S1010, it is judged that the reference image selection processing has been executed for all the image candidates, thus ending this processing. An image candidate corresponding to an ID set in Ref_ID at the end timing of the reference image selection processing is selected as a reference image. Also, the number Ncandi of image candidates of the third image group including a principal subject common to the reference image is decided.

The reference image selection processing will be described below with reference to FIG. 8 and FIGS. 9A and 9B described above. As shown in FIG. 8, the image candidates of the ID=1 and ID=7 have a common object, but as can be seen from the similarity comparison results shown in FIGS. 9A and 9B, the image candidate of the ID=7 does not include any object common to the image candidates of the IDs=2, 4, and 5. In this case, when an accumulated similarity Sum[1] of the image candidate of the ID=1 is divided by the number N=7 of candidates, an average similarity $R1_{ave}$=83.5 is obtained. Likewise, the average similarities of the image candidates of the IDs=2, 4, 5, and 7 are respectively 67.8, 72.5, 70.5, and 35.0. Therefore, with the processes of steps S1013 and S1014, the image candidate of the ID=7 is deleted. Then, since the accumulated similarity of the image candidate of the ID=1 is largest, the image candidate ID=1 is estimated as an image including a most preferable shot of the common subject, and is selected as a reference image Q.

Feature Point Voting Unit

The voting processing of similar feature points between the reference image and other image candidates by the feature point voting unit 210 (S604) will be described in detail below with reference to the flowchart shown in FIG. 11. Note that image candidates (third image group) in the feature point voting processing are read out from the image candidate list updated in the reference image selection processing (S603).

The feature point voting unit 210 reads local feature points S'k of Ncandi image candidates as corresponding points of the local feature points Qk of the reference image Q from the proximity corresponding point list generated in step S713 (S1101). Let kmax be the number of local feature points of the reference image Q.

As has been described above using the flowcharts of FIGS. 7A and 7B, the efficiency of this processing can be improved by referring to pieces of corresponding point information of two images recorded in the proximity corresponding point list in step S713 in step S1101. Of course, the similarity comparison processing may be executed again according to the flowcharts of FIGS. 7A and 7B, thus calculating local feature points S'k corresponding to the local feature points Qk of the reference image. Either of the above methods is adopted, in the voting processing of similar feature points in step S604, voting is executed based on pieces of corresponding point information with the image candidates of the third image group except for the reference image. That is, the feature point voting unit 210 votes for a local feature point having a similarity not less than a predetermined threshold for each of the local feature points of the reference image.

Next, the feature point voting unit 210 initializes a counter k required to identify a local feature point Qk of the reference image Q to "1", and initializes an array NVote[k](k=1, 2, 3, . . . , kmax), which represents the numbers of votes for respective kmax local feature points Qk of the reference image Q, to zero (S1102).

Next, the feature point voting unit 210 compares the counter k and the number kmax of feature points to determine whether or not the processing is complete for all the local feature points Qk of the reference image Q (S1103). If the processing is not complete yet (k≤kmax), the feature point voting unit 210 initializes a counter i indicating an image candidate to "1" (S1104), and compares the counter i and the number Ncandi of image candidates to determine whether or not the processing is complete for all the image candidates (S1105).

If i≤Ncandi (image candidates to be processed still remain) in step S1105, the feature point voting unit 210 refers to a list of the read S'k in step S1101 and determines whether or not the image candidate of the ID[i] includes a local feature point S'k corresponding to the local feature point Qk of the reference image Q (S1106). If the image candidate of the ID[i] includes the local feature point S'k corresponding to the local feature point Qk, the feature point voting unit 210 increments the number NVote[k] of votes for the local feature point Qk of the reference image Q (S1107), and increments the counter i to switch an image candidate (S1108). Then, the process returns to step S1105. On the other hand, if the feature point voting unit 210 judges that the image candidate does not include the local feature point S'k corresponding to the local feature point Qk, it does not update the number NVote[k] of votes, and increments the counter i to switch an image candidate (S1108). The process then returns to step S1105.

If i>Ncandi (voting associated with all the Ncandi image candidates is complete) in step S1105, the feature point voting unit 210 increments the counter k to switch the local feature point Qk of the reference image Q (S1109), and returns the process to step S1103.

Then, the aforementioned processing is continued until k>kmax (voting for all the local feature points Qk is complete) in step S1103. Thus, the numbers NVote[k] of votes for the respective local feature points Qk of the reference image Q are obtained as the accumulated numbers of votes.

Figure 11:
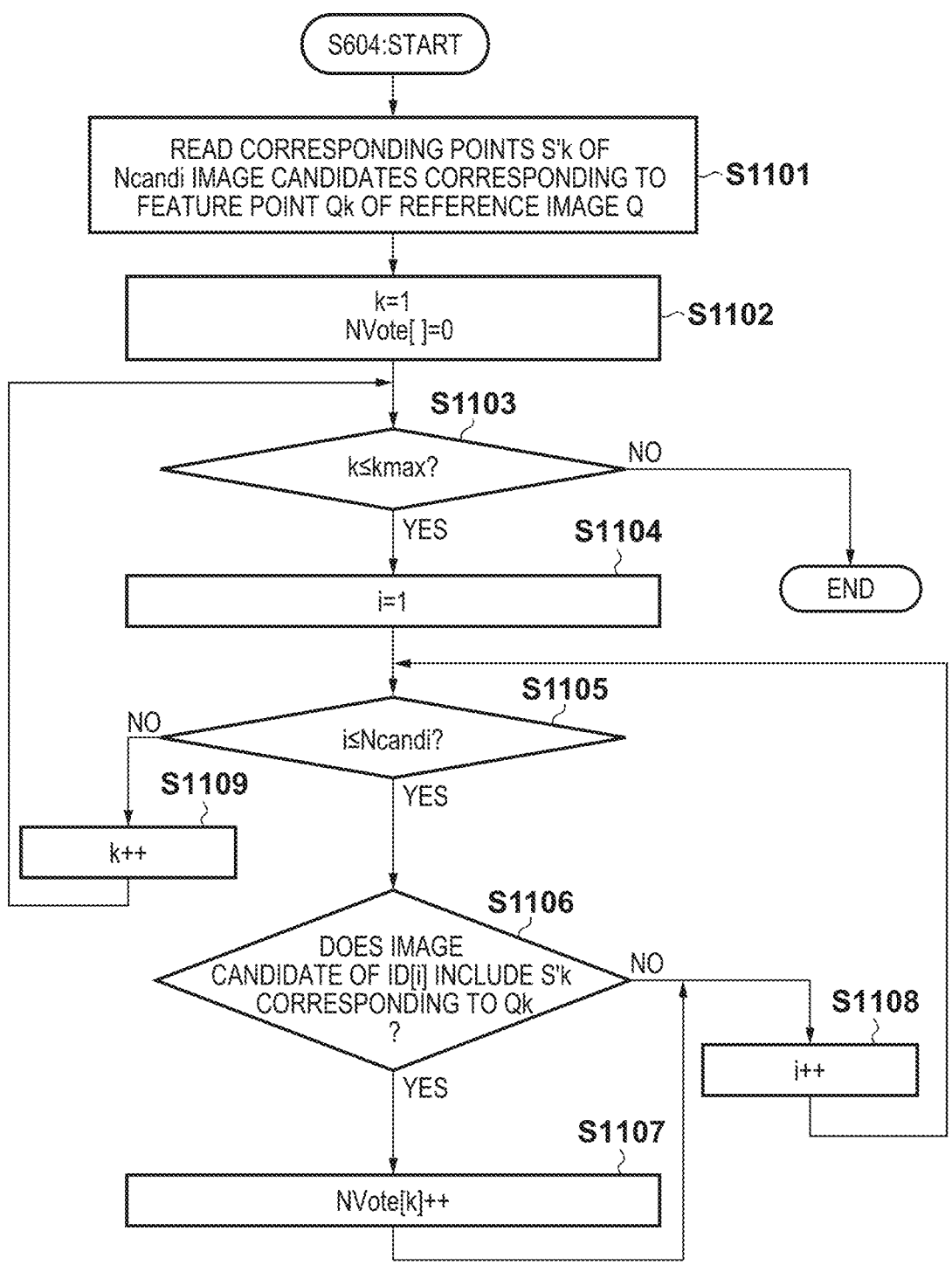
FIG. 11 is a flowchart showing feature point voting processing.

In the processing shown in FIG. 11, since the proximity corresponding point list is used, for each local feature point of the reference image, the number of image candidates having local feature points S'k, whose differences at positions corresponding to the local feature points Qk are not more than a threshold Td, is detected as NVote[k] among the image candidates. That is, NVote[k] indicates the number of images (corresponding image number) having local feature points S'k adjacent to the local feature points Qk.

By performing voting based on the image candidates including the principal subject in this way, the accumulated numbers of votes of the local feature points related to the common object of the reference image become larger than those of local feature points which are not related to the common object. In the subsequent detection processing of an object region of a principal subject, by utilizing the nature of the accumulated numbers of votes, an object region of a common subject is detected from a geometric distribution of the numbers of votes on the reference image.

Principal Subject Estimation Unit

Figure 12A:
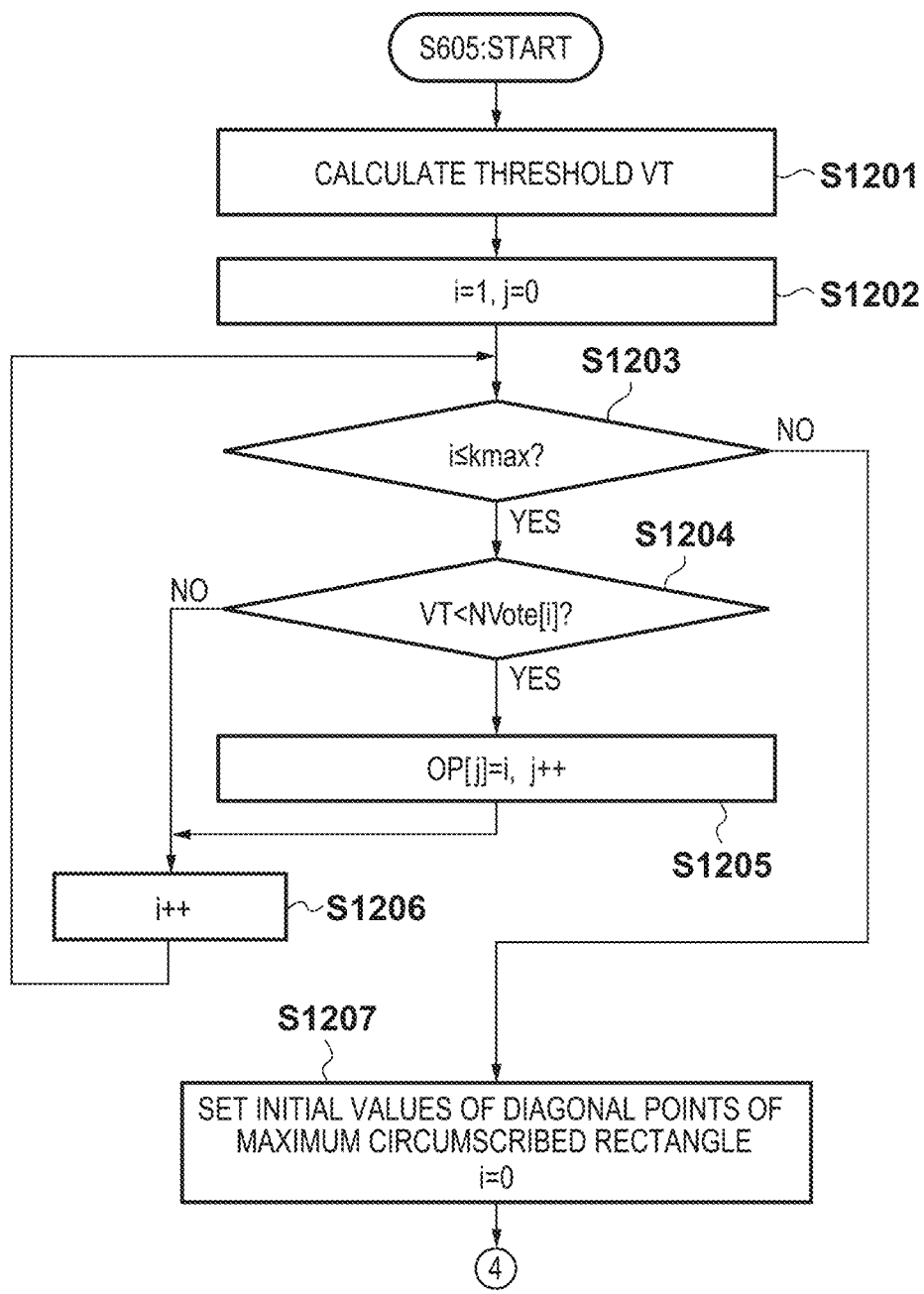
FIGS. 12A and 12B are flowcharts showing detection processing of an object region of a principal subject.
Figure 12B:
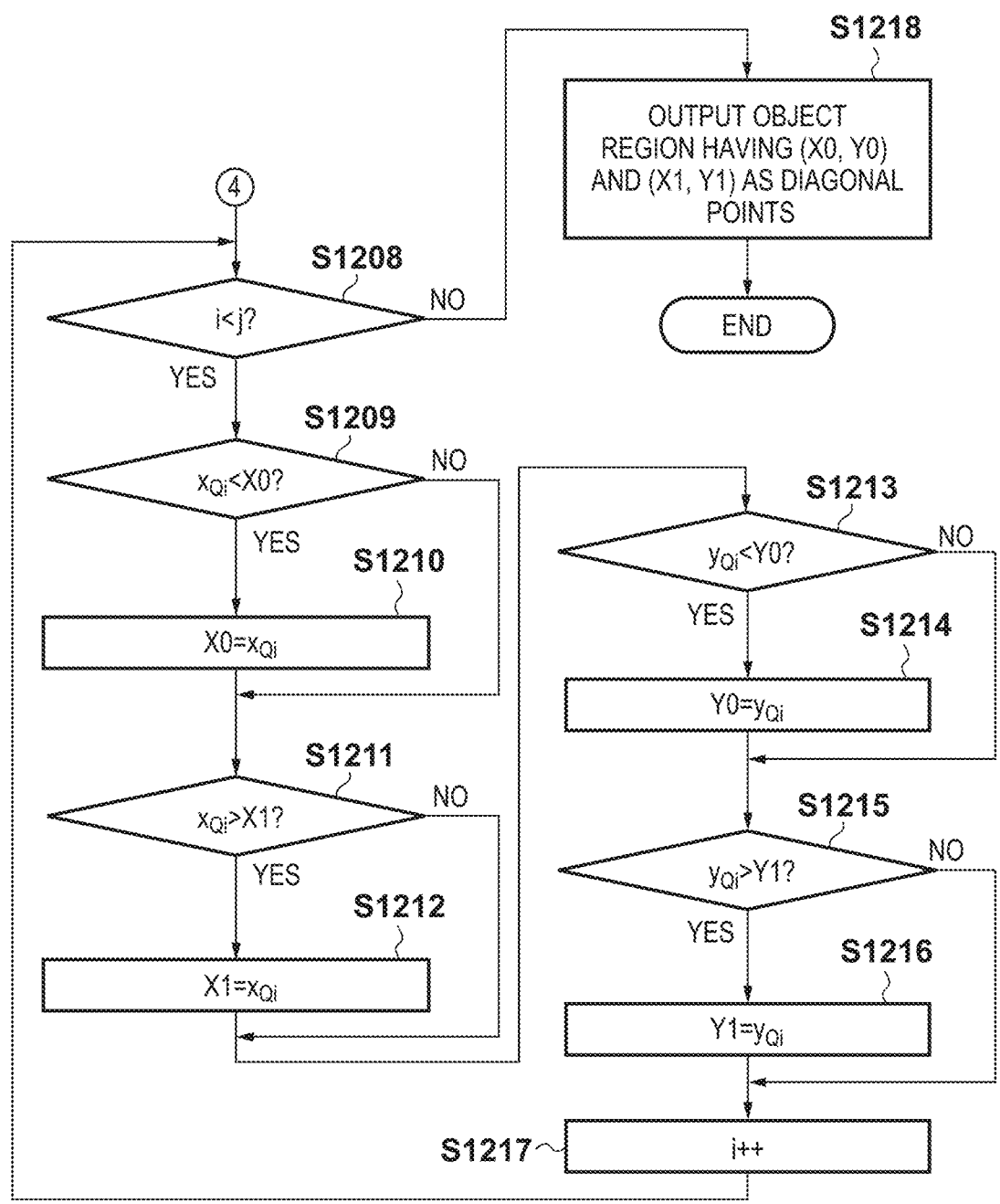

The detection processing of an object region of a principal subject by the principal subject estimation unit 211 (S605) will be described in detail below with reference to the flowcharts shown in FIGS. 12A and 12B. The principal subject estimation unit 211 detects a maximum circumscribed rectangular region of an object region as a simplest method of detecting an object region of a subject common to detection target images. That is, the principal subject estimation unit 211 detects a rectangle which includes local feature points having the numbers of votes not less than a predetermined threshold using the accumulated numbers of votes of the local feature points of the reference image calculated in step S604.

The principal subject estimation unit 211 calculates a threshold VT by multiplying the number Ncandi of image candidates including the principal subject by a predetermined ratio r (for example, 50%) (S1201). In the aforementioned example of the reference image selection processing in step S603, for example, 60% is set as the threshold of similarities so as to exclude an image candidate which does not include any common object. In the object region detection processing in step S605, by adopting a threshold lower than that in step S603, detection leakage of an object region is prevented. Note that as a smaller threshold is used, detection leakage of an object region is harder to occur, but a larger object region may be detected.

Next, the principal subject estimation unit 211 initializes a counter i required to identify a local feature point of interest to "1", and a counter j indicating the number of local feature points, the accumulated numbers of vote of which are larger than the threshold VT, to zero (S1202). Then, the principal subject estimation unit 211 compares the counter i and the number kmax of feature points to determine whether or not processing is complete for all the local feature points of the reference image Q (S1203). If the processing is not complete yet (i≤kmax), the principal subject estimation unit 211 determines whether or not the accumulated number NVote[i] of votes of the local feature point Qi is larger than the threshold VT (S1204). This determination may be attained by comparing a value obtained by multiplying NVote[i] by a predetermined coefficient and the threshold VT.

If NVote[i]>VT, the principal subject estimation unit 211 records the value of the counter i in an array OP[j], and then increments the counter j (S1205). Then, the principal subject estimation unit 211 increments the counter i (S1206), and returns the process to step S1203. On the other hand, if NVote[i]≤VT, the principal subject estimation unit 211 increments the counter i (S1206), and returns the process to step S1203.

If i≤kmax in step S1203, and the processing is complete for all the local feature points of the reference image Q, the principal subject estimation unit 211 calculates a maximum circumscribed rectangle of an object region of the principal subject on the reference image in steps S1207 to S1218. At this time, with the processing of step S1205, the array OP[i] (i=0, 1, 2, . . . , j−1) lists up local feature points, the accumulated numbers of votes of which are larger than the threshold VT (to be referred to as "inclusion feature points" hereinafter). In other words, the array OP[ ] represents a distribution of local feature points Q effective to express the object region of the principal subject.

The principal subject estimation unit 211 sets initial values in coordinates (X0, Y0) and (X1, Y1) which indicate diagonal points of the maximum circumscribed rectangle, and initializes the counter i to zero (S1207). As the coordinates of the diagonal points, a coordinate value (for example, (65535, 65535)) larger than the specifications of detection target images is set in (X0, Y0), and (0, 0) is set in (X1, Y1). Then, the principal subject estimation unit 211 compares the counters i and j to determine whether or not processing is complete for all the inclusion feature points (S1208). If inclusion feature points to be processed still remain (i<j), the principal subject estimation unit 211 determines in steps S1209 to S1216 using the array OP[i] whether or not xy coordinates of each inclusion feature points expand the maximum circumscribed rectangle estimated so far, and maximizes the maximum circumscribed rectangle. Let Qi be an inclusion feature point indicated by the array OP[i].

The principal subject estimation unit 211 compares an x coordinate $x_{Qi}$ of the inclusion feature point Qi and the diagonal point coordinate X0 (S1209). If $x_{Qi}$<X0, the principal subject estimation unit 211 replaces the value of X0 by that of $x_{Qi}$ (S1210).

Next, the principal subject estimation unit 211 compares the coordinate $x_{Qi}$ and the diagonal point coordinate X1 (S1211). If $x_{Qi}$>X1, the principal subject estimation unit 211 replaces the value of X1 by that of $x_{Qi}$ (S1212).

Likewise, the principal subject estimation unit 211 compares a y coordinate $y_{Qi}$ of the inclusion feature point Qi and the diagonal point coordinate Y0 (S1213). If $y_{Qi}$<Y0, the principal subject estimation unit 211 replaces the value of y0 by that of $y_{Qi}$ (S1214).

Next, the principal subject estimation unit 211 compares the coordinate $y_{Qi}$ and the diagonal point coordinate Y1 (S1215). If $y_{Qi}$>Y1, the principal subject estimation unit 211 replaces the value of Y1 by that of $y_{Qi}$ (S1216). Then, the principal subject estimation unit 211 increments the counter i (S1217), and returns the process to step S1208.

If i=j in step S1208 (the processing is complete for all the inclusion feature points), the principal subject estimation unit 211 outputs a rectangle having the finally set two points (X0, Y0) and (X1, Y1) as diagonal points as an object region of the principal subject (S1218), thus ending the object region detection processing. Of course, an image of the object region may be cropped from the reference image, and the cropped image may be output as an object image of the principal subject.

In the above example, the object region of the principal subject is detected from the reference image. Alternatively, by executing this detection processing for all image candidates including the principal subject, images obtained by cropping object regions of the principal subject from the detection target images can be browsed. For this purpose, the transformation matrices M and T between images used in step S711 have to be calculated again for the reference image and each image candidate, or have to be recorded during the corresponding processing in step S711. By performing coordinate transformations of the object region of the principal subject of the reference image using the transformation matrices M and T, the object region of the principal subject can be calculated from each of image candidates including the principal subject.

Furthermore, an importance level of the principal subject may be defined, and may be output together with the object region of the principal subject. For example, the number Ncandi of image candidates selected as those including an object of the principal subject or a value obtained by dividing the number N of image candidates before selection by the number of detection target images may be defined as an importance level. When Ncandi is used, in the example of the image group shown in FIG. 8, an object "church" corresponds to the principal subject, and its importance level is calculated as 4/7=57%.

In this manner, by considering a most frequently shot subject in a plurality of images as a principal subject, an object region of the principal subject commonly included in a plurality of images is detected, and an object of the principal subject can be extracted. Furthermore, the importance level of the principal subject can be estimated. Therefore, object mining in large quantities of images can be made. Thus, upon browsing images obtained by cropping object regions of the principal subject, or upon thumbnail display or clustering display, images which emphasize the object of the principal subject can be used, thus allowing the user to easily recognize image contents.

Second Embodiment

The second embodiment of the present invention will be described below. The arrangements of an image processing apparatus and object detection processing unit in the second embodiment are the same as those in the first embodiment, and a description thereof will not be repeated. In the second embodiment, an object region of a principal subject common to a plurality of images is detected as in the first embodiment. In the second embodiment, candidates of a reference image are further narrowed down to improve the selection precision of the reference image compared to the first embodiment.

The reference image selection processing of the second embodiment will be described below. A reference image selection unit 209 narrows down image candidates to a third image group including image pairs having higher similarities according to the flowcharts shown in FIGS. 13A and 13B, and then selects a reference image according to the flowcharts shown in FIGS. 10A and 10B.

In the first embodiment, a certain image candidate of interest is selected, and an accumulated similarity between the image candidate of interest and other image candidates is calculated, and undergoes threshold processing, thereby judging whether or not the image candidate of interest is applicable as a reference image. However, when the number of image candidates is small, an accumulated similarity decreases under the influence of one image candidate having a low similarity, and image candidates to be originally left may be deleted in step S1014.

Then, in the second embodiment, prior to execution of the reference image selection processing, processing for narrowing down image candidates to a third image group including image pairs having high similarities is added. For example, in FIG. 9B which shows similarity comparison processing results for seven images shown in FIG. 8, images of IDs=1, 2, 4, 5, and 7, similarities of which exceed 80, are simply selected as image candidates in the first embodiment. In the second embodiment, images whose similarities exceed 80 are narrowed down to images of IDs=1, 2, 4, and 5, which satisfy mutually favorable similarity relations, as image candidates.

For example, a certain image is selected as an image of interest, and if a similarity with each of remaining images is not less than 80, "1" is voted; if it is less than 80, "0" is voted, and this voting is made for all combinations of images. Then, when the accumulated number of votes of the image of interest is less than a certain threshold, the image of interest is excluded from image candidates. However, when the threshold for the accumulated number of votes is too large, even a necessary image may be excluded. Hence, processing may be started from a lower threshold, and may be recursively repeated while gradually increasing the threshold, thereby narrowing down to image pairs having similarities not less than 80 as image candidates.

Image Candidate Narrowing Down Processing

Figure 13B:
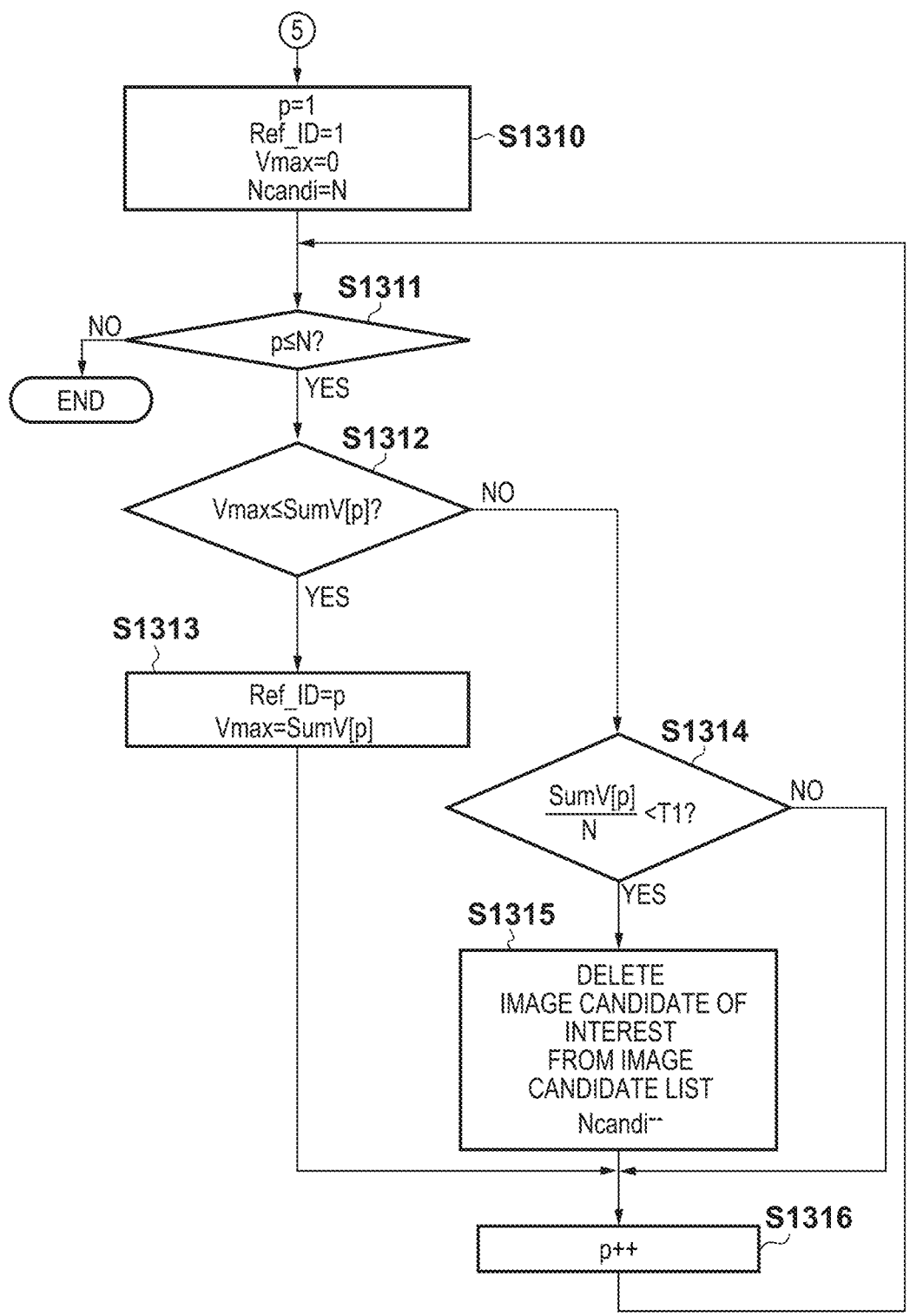

The image candidate narrowing down processing will be described in detail below with reference to FIGS. 13A and 13B. Note that IDs of N image candidates which are stored in an image candidate list in step S602 in the former stage, and have similarities not less than a predetermined threshold Ts, will be described as ID[i] (i=1, 2, 3, . . . , N).

The reference image selection unit 209 reads the number N of image candidate, IDs of respective image candidates, and similarities $R_{i,j}$ between image candidates of ID[i] and ID[j] (i≠j) from the image candidate list (S1301). Next, the reference image selection unit 209 initializes a counter p required to identify an image candidate of interest to "1", and the accumulated number SumV[p](p=1, 2, 3, . . . , N) of votes which represents a total similarity with other image candidates to zero (S1302).

Next, the reference image selection unit 209 determines whether or not the counter p exceeds the number N of candidates (S1303). If the counter p does not exceed the number N of candidates, the reference image selection unit 209 initializes a counter L to "1" (S1304). The counter L is used to express an image candidate upon calculation of the accumulated number SumV[p] of votes. Then, the reference image selection unit 209 determines whether or not image candidates as accumulation targets of number of votes remain (S1305).

If the image candidates as accumulation targets remain, the reference image selection unit 209 determines whether or not a similarity $R_{p,L}$ between the image candidate ID[p] of interest and image candidate ID[L] as an accumulation target reaches a predetermined threshold th2 (for example, 80) (S1307). If the similarity $R_{p,L}$ reaches the predetermined threshold th2, the reference image selection unit 209 increments the accumulated number SumV[p] of votes (S1308), increments the counter L (S1309), and returns the process to step S1305. If the similarity $R_{p,L}$ does not reach the predetermined threshold th2, the reference image selection unit 209 increments the counter L (S1309), and returns the process to step S1305.

In this way, the accumulated number of votes indicating the number of other image candidates which exhibit high similarities with the image candidate ID[p] of interest indicated by the counter p is counted in the loop of steps S1305 to S1309. Then, if the counter L reaches the number N of candidates in step S1305, the reference image selection unit 209 increments the counter p (S1306), and returns the process to step S1303.

The processes of steps S1303 to S1309 are repeated until p>N in step S1303, that is, for all the image candidates, thus acquiring the accumulated numbers SumV[i] of votes for all the image candidates.

If p>N in step S1303, the reference image selection unit 209 performs selection of a reference image used upon detection of a principal subject and deletion of image candidates which are unlikely to include a principal subject.

Initially, the reference image selection unit 209 performs various initializations (S1310). That is, the reference image selection unit 209 initializes the counter p which represents an image candidate of interest to "1", Ref_ID which represents a reference image to "1", the maximum accumulated number Vmax of votes to zero, and the number Ncandi of image candidates including the principal subject to the total number N of image candidates. As described above, Ncandi is decremented when an image candidate which is unlikely to include the principal subject is determined.

Next, the reference image selection unit 209 determines whether or not the counter p exceeds the number N of candidates (S1311). If the counter p does not exceed the number N of candidates, the reference image selection unit 209 compares the accumulated number SumV[p] of votes of the image candidate of interest and the current maximum accumulated number Vmax of votes (S1312). As a result of comparison, if SumV[p]≥Vmax, the reference image selection unit 209 updates Vmax to SumV[p] by setting the value of the counter p indicating the image candidate of interest in Ref_ID indicating the reference image (S1313). After that, the counter p is incremented to select the next image candidate as the image candidate of interest (S1316), and the process returns to step S1311.

On the other hand, if SumV[p]<Vmax, the reference image selection unit 209 determines whether or not the accumulated number SumV[p] of votes is less than a value N×T1 obtained by multiplying the number N of candidates by a predetermined coefficient T1 (0<T1<1) (S1314). If SumV[p]<N×T1, the reference image selection unit 209 deletes the image candidate of interest from the image candidate list, and decrements the number Ncandi of image candidates (S1315). After that, the counter p is incremented to select the next image candidate as the image candidate of interest (S1316), and the process returns to step S1311.

If it is determined in step S1314 that SumV[p]≥N×T1, the reference image selection unit 209 does not delete the image candidate of interest, and increments the counter p to select the next image candidate as the image candidate of interest (S1316). Then, the process returns to step S1311.

Of course, the processing of step S1314 may compare SumV[p]/N obtained by dividing the accumulated number SumV[p] of votes by the number N of candidates and the coefficient T1 as the threshold. In this case, if SumV[p]/N<T1, the process advances to step S1315; if SumV[p]/N≥T1, the process advances to step S1316.

Then, if p>N in step S1311, it is judged that the image candidate narrowing down processing has been executed for all the image candidates, thus ending the image candidate narrowing down processing. Also, the number Ncandi of image candidates of a third image group including the principal subject is decided.

The image candidate narrowing down processing is recursively executed while sequentially changing the coefficient T1. That is, the narrowing down processing is started from, for example, a low coefficient T1 (for example, 0.5), is recursively executed while increasing the coefficient T1 in increments of, for example, 0.1, and ends at, for example, T1=0.7. Upon recursively executing the narrowing down processing, Ncandi calculated in the immediately preceding processing is used as the number N of image candidates. By gradually increasing the coefficient T1, an image candidate having a smaller number of partners (image candidates) with similarity relations is excluded earlier, and image candidates are finally converged to the third image group including image pairs having high similarities (for example, 80 or higher). That is, targets of the reference image selection processing can be narrowed down to more applicable image candidates.

The example shown in FIG. 9B shows that images of ID=1 and ID=7 have a common object, and images of ID=7 and IDs=2, 4, and 5 do not have any common object. A case will be examined below wherein the image candidate narrowing down processing is applied to five images of IDs=1, 2, 4, 5, and 7. When the processing is started to have a coefficient T1=0.5 as an initial value, since the number N=5 of image candidates, T1×N=5×0.5=2.5. The accumulated number of votes of the image of the ID=1 is 4, and the accumulated numbers of votes of the images of the IDs=2, 3, and 5 are 3, and the accumulated number of votes of the image of the ID=7 is 1.

Therefore, in steps S1314 and S1315, the image of the ID=7 is deleted from the image candidate list, resulting in the number N=4 of image candidates. In the subsequent processes of T1=0.6 to 0.7, since T1×N=2.4 to 2.8, and no image is deleted from the image candidate list, the four images of the IDs=1, 2, 4, and 5 are narrowed down as final image candidates.

Figure 10A:
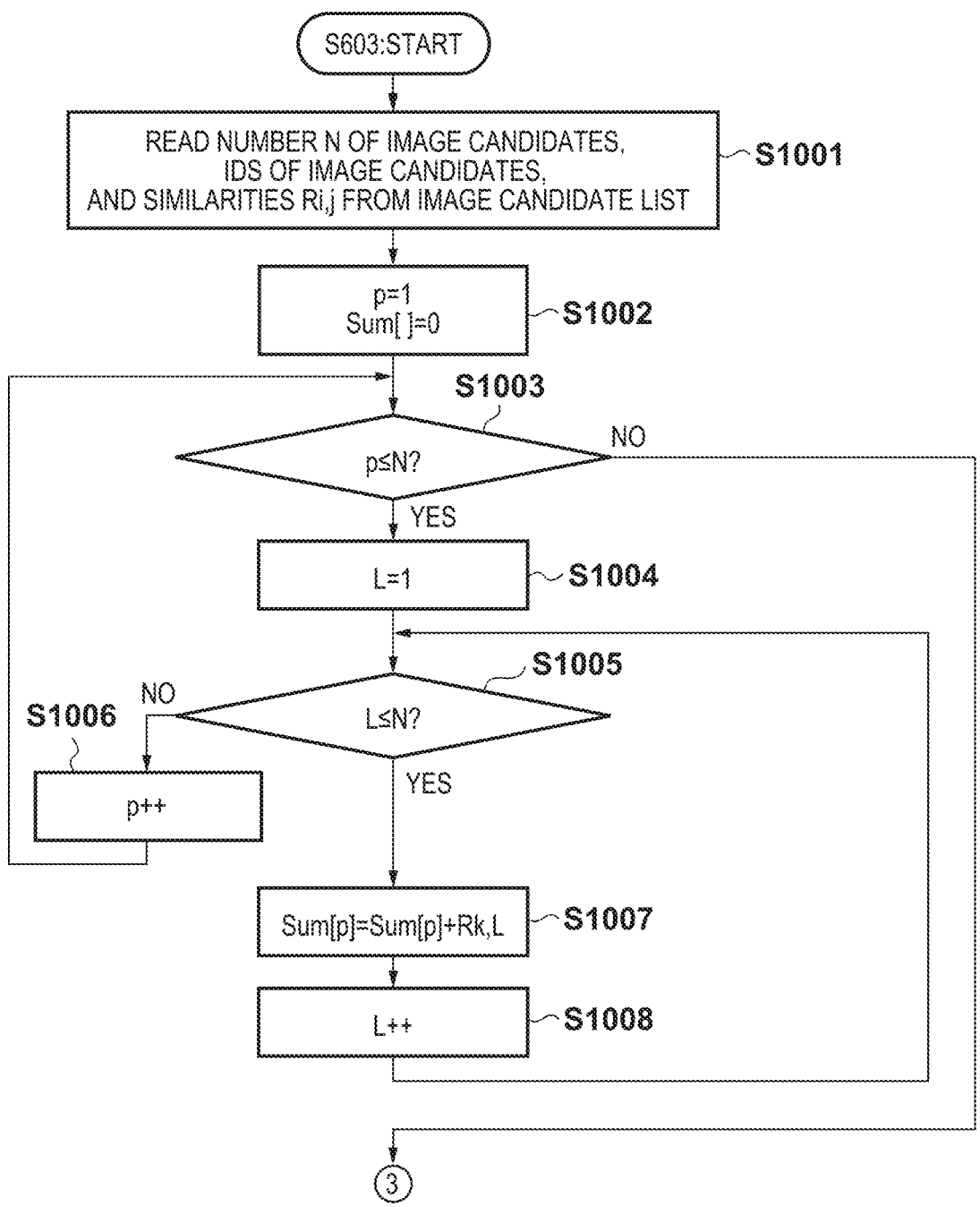
FIGS. 10A and 10B are flowcharts showing reference image selection processing.
Figure 10B:
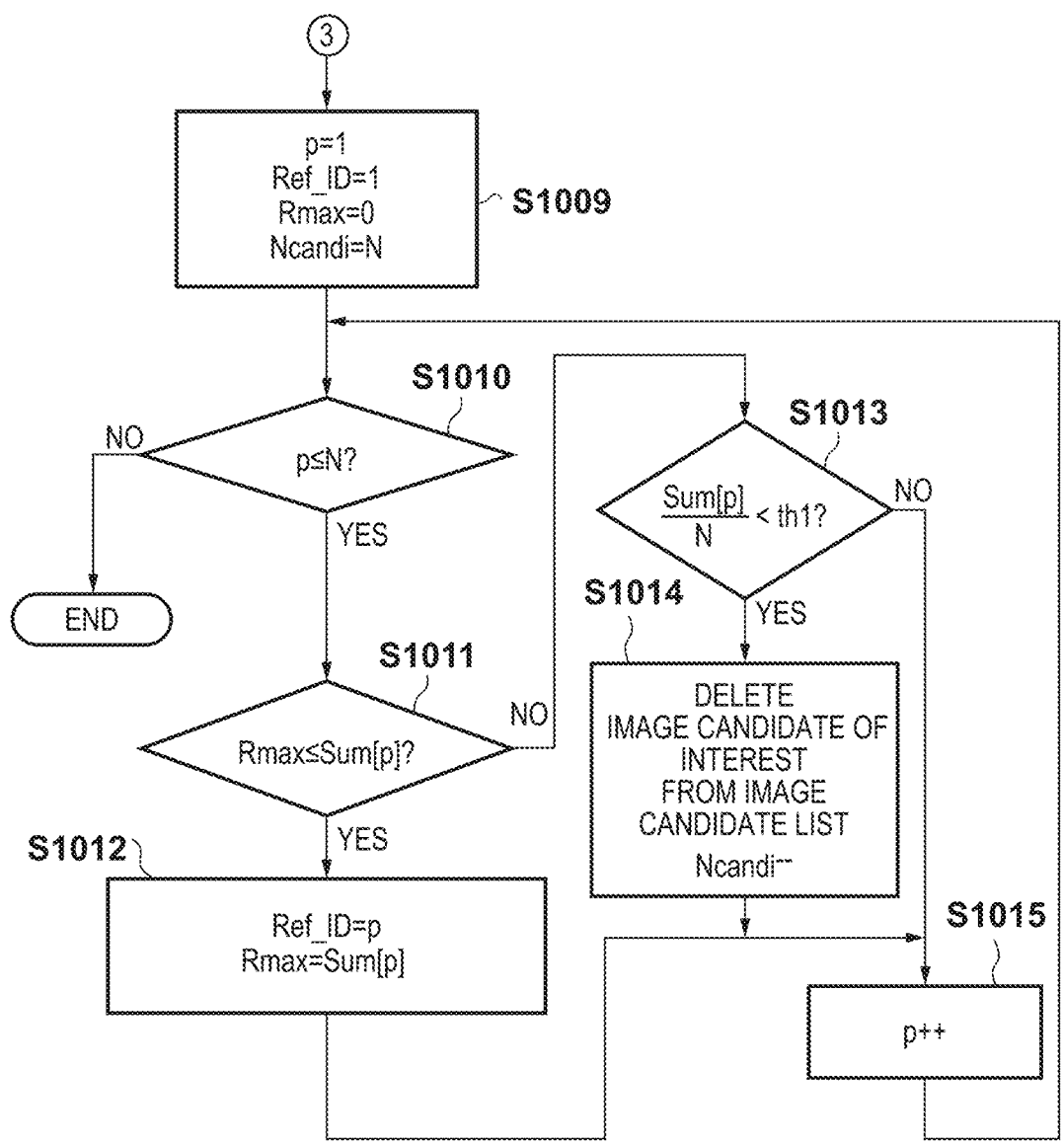

Next, the reference image selection processing is executed according to the flowcharts shown in FIGS. 10A and 10B. However, the processing excluding processing for deleting an image candidate of interest from the image candidate list shown in FIG. 10B (S1013, S1014) is executed. That is, if Sum[p]<Rmax in step S1011, the reference image selection unit 209 increments the counter p to select the next image candidate as the image candidate of interest (S1015), and returns the process to step S1010.

As a result of the reference image selection processing, in case of the example of FIG. 9B, an average similarity $R_{1ave}$ (=Sum[1]/N) is 84.3, and average similarities $R_{ave}$ of the images of the IDs=2, 4, and 5 are respectively 83.3, 88.3, and 85.0. Based on these results, the image of the ID=4 having the highest average similarity is selected as the reference image.

In this manner, the reference image is selected from the third image group obtained by narrowing down image candidates selected in step S602 to those which are more likely to include the principal subject. Therefore, the selection precision of the reference image can be improved.

Third Embodiment

The third embodiment of the present invention will be described below. The arrangements of an image processing apparatus and object detection processing unit of the third embodiment are the same as those in the first embodiment, and a description thereof will not be repeated.

The first embodiment has exemplified the case in which a maximum circumscribed rectangle of an object region of a principal subject in a reference image is calculated by detection processing of an object region of a principal subject. However, when an object region is close to four sides of a reference image, a principal subject may fall outside a field angle, and the entire image of the subject may not be included. An image of ID=2 in FIG. 8 corresponds to this image example.

Also, in a reference image, it is preferable that an object region of a principal subject does not fall outside an image end, and an entire image of the subject is included as large as possible. This is because the number of feature points detected from an image increases as an image size is larger.

Hence, in the third embodiment, after the detection processing of an object region of a principal subject, a distance of the detected object region from an image end is evaluated. The detection processing of an object region of a principal subject is repeated while changing a reference image until an evaluation value satisfies a predetermined condition.

The detection processing of an object region of a principal subject of the third embodiment will be described below with reference to the flowchart shown in FIG. 14.

Figure 6:
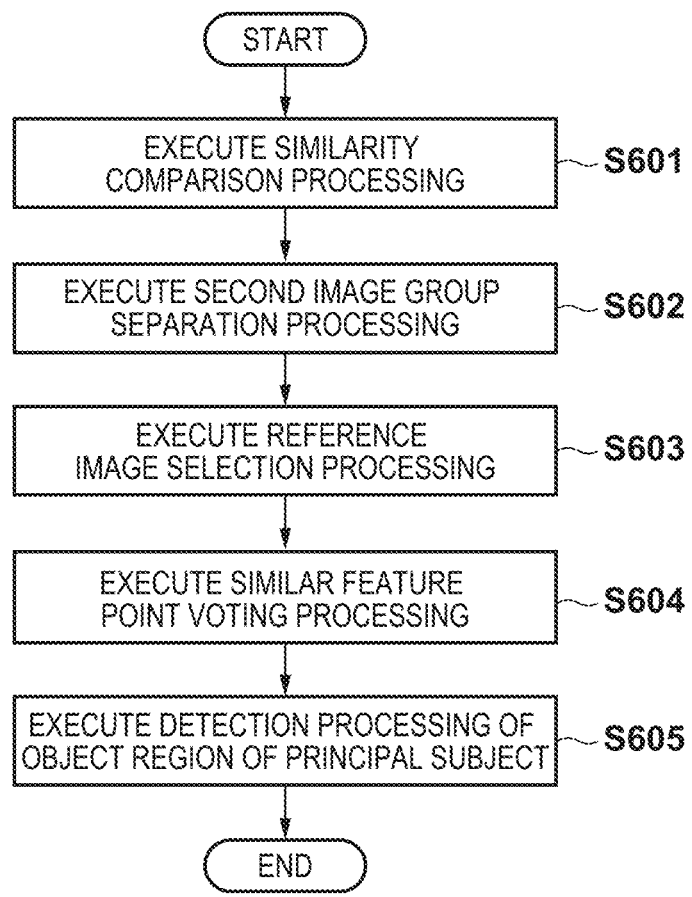
FIG. 6 is a flowchart showing processing of a principal subject detection unit.
Figure 14:
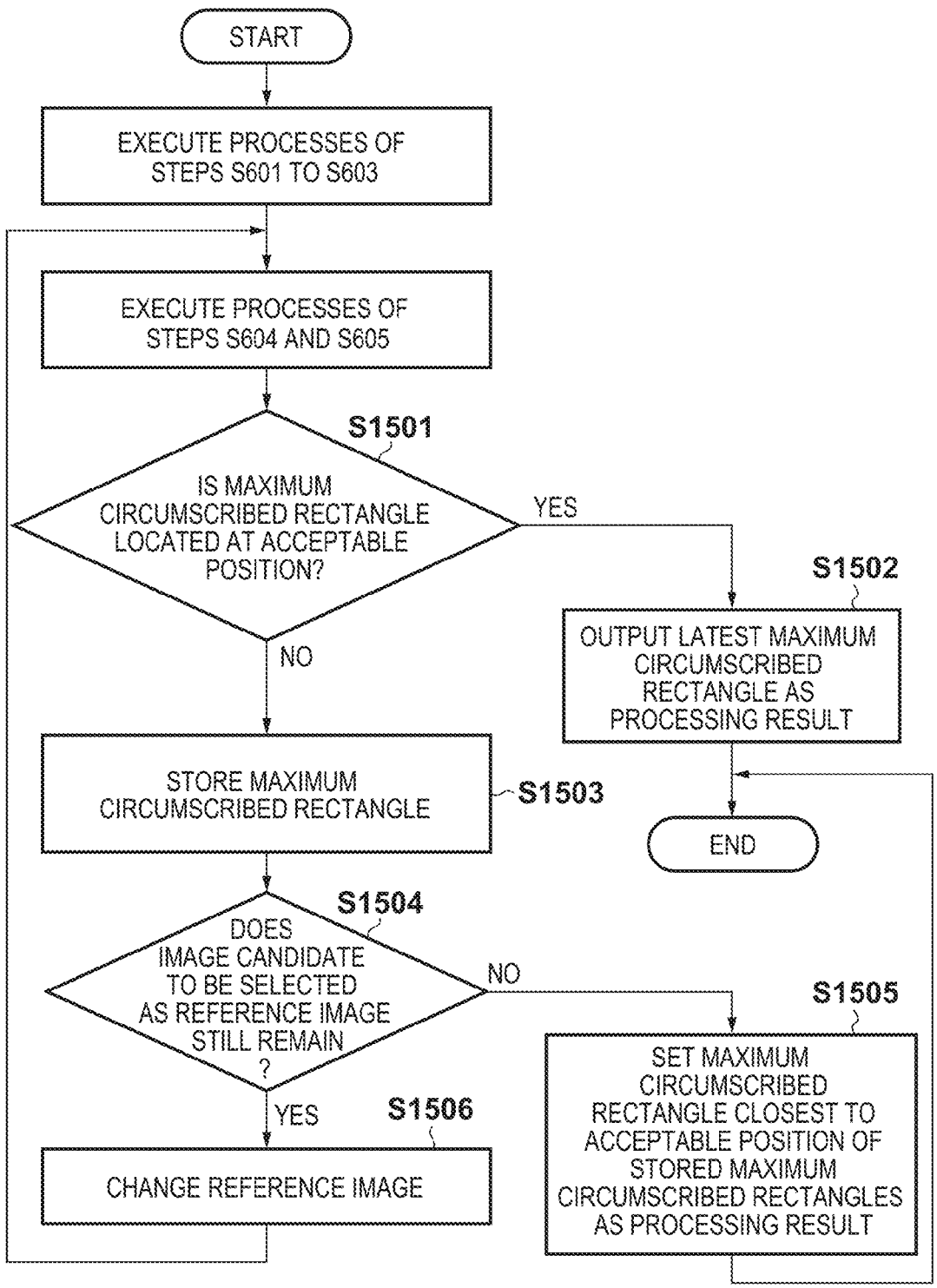
FIG. 14 is a flowchart showing detection processing of an object region of a principal subject according to the third embodiment.

Since the processes of steps S601 to S605 in FIG. 14 are the same as those in FIG. 6 described in the first embodiment, a detailed description thereof will not be repeated.

After a maximum circumscribed rectangle of an object region of a principal subject on a reference image is detected by the processes of steps S601 to S605, a principal subject estimation unit 211 determines whether or not the object region is located at an acceptable position (S1501). When the entire object region falls within the reference image and its size is sufficient, it is determined that the object region is located at the acceptable position. This determination is made by seeing whether or not the barycentric position of the object region and distances (margins) between the object region and reference image ends (four sides) satisfy a predetermined barycentric condition and distance condition based on the acceptable position.

If it is determined that the maximum circumscribed rectangle is located at the acceptable position, the principal subject estimation unit 211 outputs a latest maximum circumscribed rectangle as a object region detection processing result (S1502), thus ending the detection processing of the object region of the principal subject.

On the other hand, if it is determined that the object region is not located at the acceptable position, the principal subject estimation unit 211 stores the maximum circumscribed rectangle detected as the object region in a predetermined area of a RAM 105 (S1503). That is, the principal subject estimation unit 211 stores the detected maximum circumscribed rectangle even though it does not satisfy the distance condition or barycentric condition, so as to select a maximum circumscribed rectangular region closest to the acceptable position of the detected maximum circumscribed rectangular regions.

Next, the principal subject estimation unit 211 determines whether or not image candidates to be selected as a reference image still remain (S1504). If no image candidate to be selected remains, the principal subject estimation unit 211 selects the maximum circumscribed rectangle closest to the acceptable position of those stored in step S1503 as the object region detection processing result (S1505), thus ending the detection processing of the object region of the principal subject. If image candidates to be selected as a reference image still remain, a reference image is changed (S1506), and the process returns to step S604.

In this manner, the object region detection result is obtained when an image including an entire image of a principal subject with a sufficiently large size is used as the reference image, thus improving the detection precision of the principal subject.

Fourth Embodiment

The fourth embodiment of the present invention will be described below. Since the arrangements of an image processing apparatus and object detection processing unit according to the fourth embodiment are the same as those in the first embodiment, a description thereof will not be repeated. In the fourth embodiment, an object region of a principal subject common to a plurality of images is detected as in the first embodiment.

Figure 15:
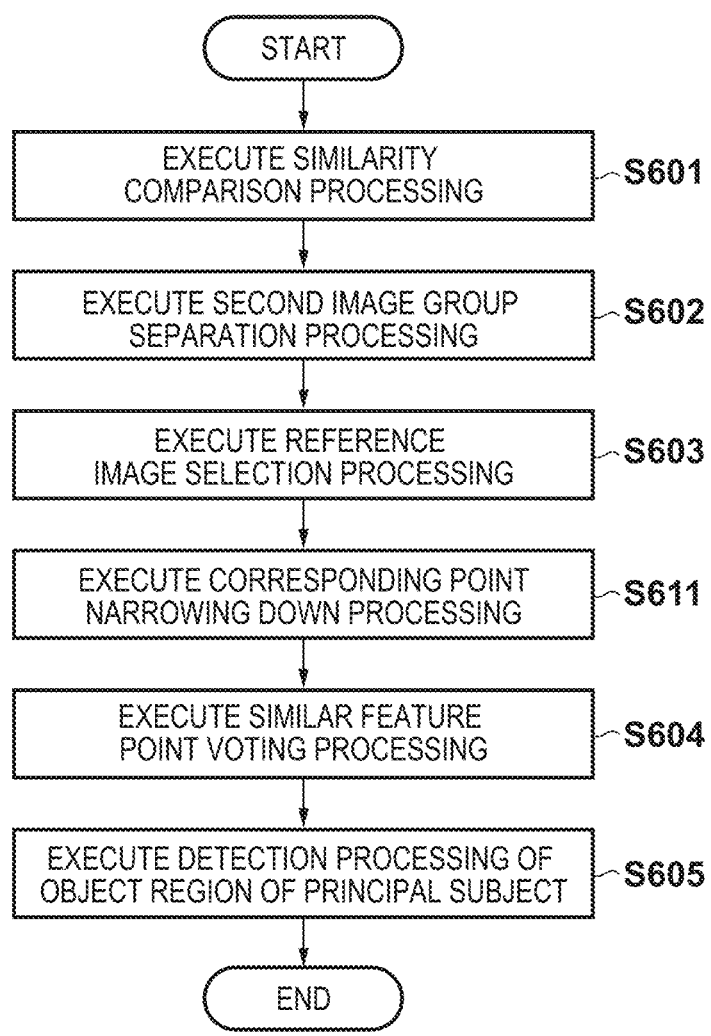
FIG. 15 is a flowchart showing processing of a principal subject detection unit according to the fourth embodiment.

In the fourth embodiment, processing is added before the feature point voting processing (S604) in the flowchart shown in FIG. 6. FIG. 15 is a flowchart showing the processing of a principal subject detection unit 20 of the fourth embodiment. In this flowchart, processing for narrowing down corresponding points registered in a proximity corresponding point list related to a reference image to an effective corresponding point (S611) is added. With this corresponding point narrowing down processing, the precision of the subsequent feature point voting processing in step S604 can be improved. Note that the processes of steps S601 to S603, S604, and S605 are the same as those of the first embodiment, and a detailed description thereof will not be given.

Concept of Corresponding Point Narrowing Down Processing

Figure 16A:
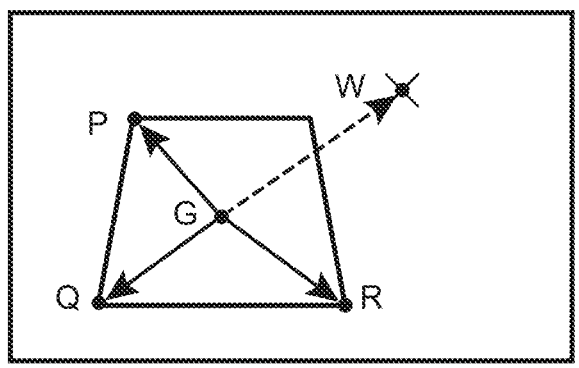
FIGS. 16A and 16B are views for explaining the concept of corresponding point narrowing down processing.
Figure 16B:
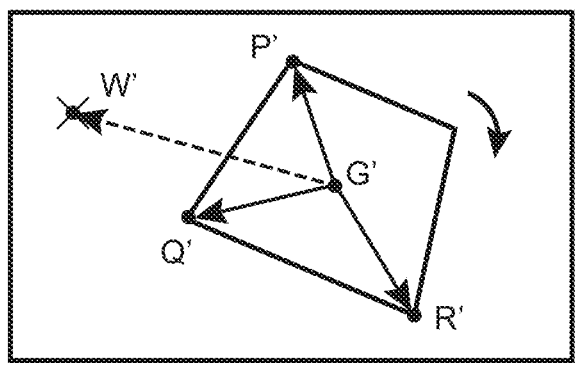

The concept of the corresponding point narrowing down processing will be described below with reference to FIGS. 16A and 16B. FIG. 16A shows a reference image, and also shows a barycenter G of a principal subject and local feature points P, Q, R, and W. FIG. 16B shows a comparison image, and also shows a barycenter G' of an object of a principal subject and local feature points P', Q', R', and W' as corresponding points.

An angle vectors GQ and GR make with respect to a vector GP in the reference image is equal to an angle vectors G'Q' and G'R' make with respect to a vector G'P' in the comparison image, and a difference between these angles is almost zero. However, an angle vectors GP and GW make in the reference image is largely different from that of vectors G'P' and G'W' make in the reference image, and a difference between these angles is also large.

Based on such nature, angle differences between the reference image and comparison image are calculated for respective corresponding points in the proximity corresponding point list, and a modal angle difference, average, and variance are calculated. The modal angle difference indicates a rotation angle of an object between the reference image and comparison image. Then, it can be judged that a corresponding point pair having an angle difference departing from the modal angle difference is more likely to be a wrong corresponding pair.

Corresponding Point Narrowing Down Processing

Figure 17:
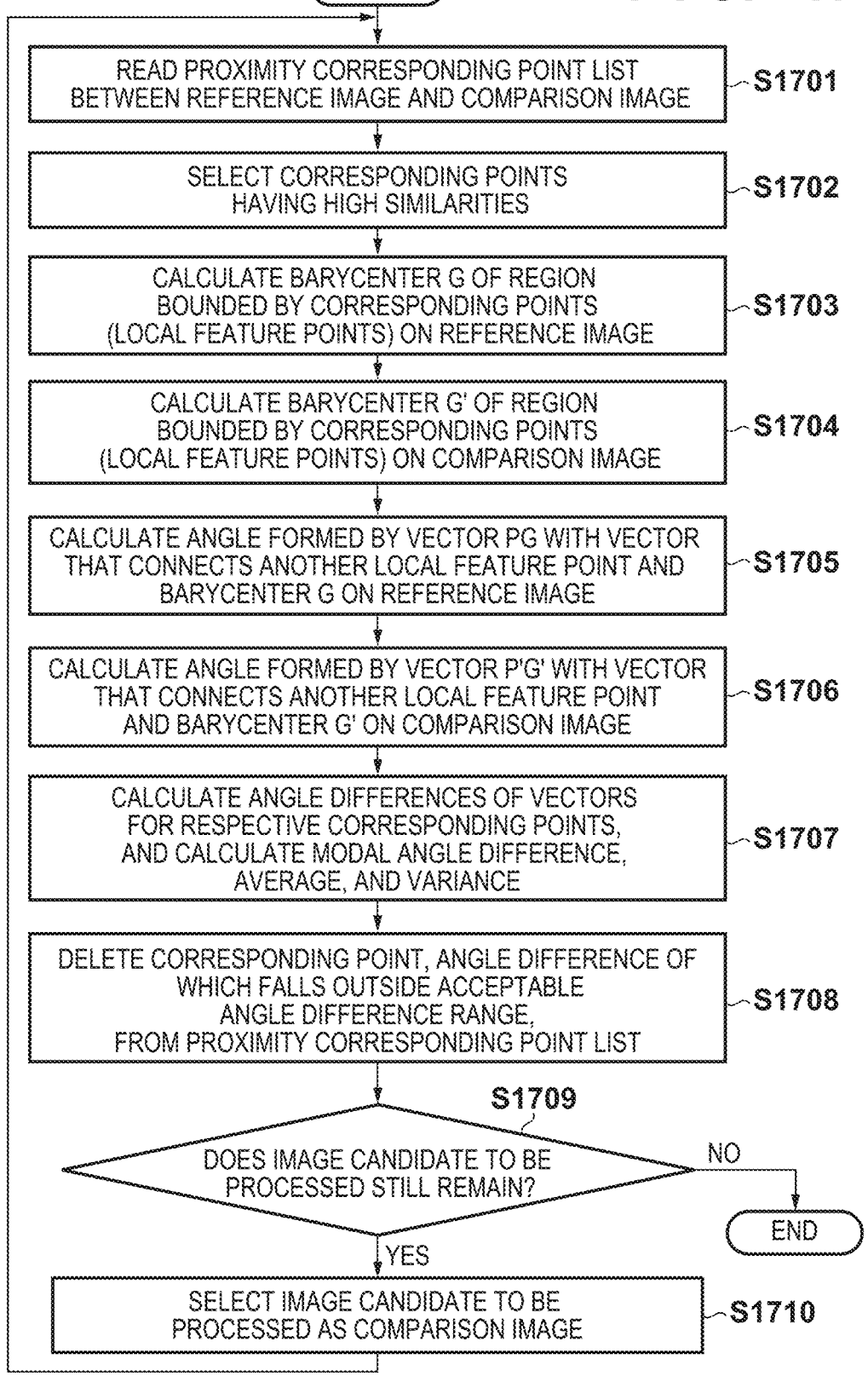
FIG. 17 is a flowchart showing the corresponding point narrowing down processing.

The corresponding point narrowing down processing (S611) based on the above principle will be described below with reference to the flowchart shown in FIG. 17.

A feature point voting unit 210 (or reference image selection unit 209) reads a proximity corresponding point list indicating corresponding point information between the reference image and image candidates (comparison images) other than the reference image (S1701). Then, the feature point voting unit 210 selects top S corresponding points having high similarities of those included in the proximity corresponding point list (S1702). The number S of points to be selected may be about 20. Alternatively, threshold processing may be executed based on similarities. However, in this case, exception processing which sets the number of points to be selected to be about 20 is required.

Next, the feature point voting unit 210 calculates a barycenter G of a region bounded by the S corresponding points (local feature points) in the reference image (S1703). The barycenter is desirably that of an object of a principal subject, but it may not be an accurate barycenter of the object. Subsequently, the feature point voting unit 210 similarly calculates a barycenter G' in the comparison image (S1704).

Next, the feature point voting unit 210 selects a corresponding point (local feature point) P having the highest similarity as a reference in the reference image with reference to the proximity corresponding point list, and calculates angles formed by a vector PG with vectors which couple other corresponding points (local feature points) and the barycenter G (S1705).

Next, the feature point voting unit 210 selects a corresponding point (local feature point) P' having the highest similarity as a reference in the comparison image with reference to the proximity corresponding point list, and calculates angles formed by a vector P'G' with vectors which couple other corresponding points (local feature points) and the barycenter G' (S1706).

Next, the feature point voting unit 210 calculates differences between the angles of the vectors for respective corresponding points based on the proximity corresponding point list, and calculates a modal angle difference, average, and variance (S1707). Then, the feature point voting unit 210 deletes a corresponding point, an angle difference of which falls outside an acceptable angle difference range obtained by adding a predetermined angle range to the modal angle difference, from the proximity corresponding point list (S1708), and returns the process to step S1701.

The modal angle difference indicates a rotation angle of an object between the reference image and comparison image. Therefore, the determination processing of step S1708 can exclude a corresponding point which does not satisfy a condition based on the rotation angle from the proximity corresponding point list. Note that the angle range can be decided empirically, and for example, an acceptable angle difference range is about the modal angle difference±5°.

In the example of FIGS. 16A and 16B, a pair of the local feature point W of the reference image and the local feature point W' of the comparison image (corresponding points) are deleted from the proximity corresponding point list.

Next, the feature point voting unit 210 determines whether or not image candidates to be processed still remain (S1709). If image candidates to be processed still remain, the feature point voting unit 210 selects the next image candidate as a comparison image (S1710), and returns the process to step S1701. If no image candidate to be processed remains, the corresponding point narrowing down processing ends.

After that, similarity comparison processing including geometric transformation of coordinates of local feature points is newly executed according to the flowcharts shown in FIGS. 7A and 7B to calculate local feature points of a comparison image, which correspond to local feature points of the image of interest, thus improving the detection precision of wrong corresponding points. However, since this processing is executed between the reference image and a plurality of image candidates, processing cost as many as the number of image candidates is generated. Of course, by only the processing shown in FIG. 17, wrong corresponding points can be sufficiently deleted.

Since corresponding points related to an object of a principal subject are narrowed down by deleting wrong corresponding points in this way, the processing precision of step S604 and subsequent steps can be improved.

Modification of Embodiments

The aforementioned embodiments have exemplified the case in which the exhaustive comparison processing is performed for detection target images. As for images including objects such as landmarks which can be associated with geographic information, narrowing down processing for grouping images to be compared may be executed in advance.

Upon selection of a reference image, an arbitrary image may be selected from image candidates. In this case, since an optimal reference image is not always selected, the detection precision of an object of a principal subject may deteriorate, but the processing can be simplified.

As another method of selecting a reference image from image candidates, voting results based on distances between feature amounts can also be used as in the similar feature voting processing. That is, local feature points, distances between feature amounts of which are not more than a predetermined threshold (fourth threshold) of those corresponding to other image candidates, are counted for each image candidate, and an image candidate with the largest count value is selected as a reference image. Note that a distance between feature amounts is that in either of two images including local feature points. When a reference image is selected by such method, the number of votes may be increased in the subsequent voting processing of similar feature points (S604), and an object region can be detected with higher precision.

Figure 18:
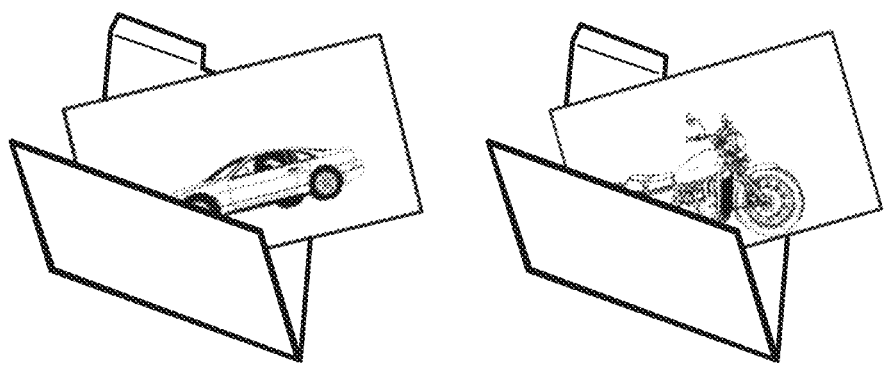
FIG. 18 is a view showing an example of images of detected object regions as icons.

Furthermore, an image of a detected object region can be cropped from the reference image, and can be used as an icon or thumbnail. FIG. 18 shows an example in which images of object regions are used as icons of folders which store image data.

When image data (corresponding to detection target images) are stored in a folder, the image processing apparatus executes the aforementioned principal subject detection processing, and detects an object region of a subject common to these image data. Then, the image processing apparatus crops an image of the object region from the reference image, and uses the cropped image as an icon of that folder. The user can easily access images including a desired subject with reference to the icons of the folder.

When it is not preferable to store unique image data in a folder in terms of processing precision, entities of image data are not stored in the folder, but link information to each image data may be stored in the folder. Especially, in case of image data commonly having objects of a plurality of subjects, efficient storage and search operations can be made compared to storage of entities of image data in respective folders.

Also, the simple method using the maximum circumscribed rectangle in the detection processing of an object region of a principal subject (S605) has been explained. Alternatively, local feature points located at an outer circumference of an object region may be estimated, and a maximum circumscribed polygon formed by coupling the estimated local feature points may be used as a detection result.

As described above, in the present invention, pairs of feature points are generated, for each of a plurality of second images other than a first image in an image group including a plurality of images, by associating feature points of the second image with feature points of the first image based on their feature amounts. Next, pairs of feature points, positions of feature points of the second image in the pairs of feature points of which are located within a predetermined region, are detected. Then, a region (for example, a circumscribed rectangle or polygon), which includes feature points of the first image, the number of detected pairs of feature points of which exceeds a threshold, is extracted.

The image group is a set of images which are similar to each other. The first image is an image selected from the set of similar images based on similarities with other images.

When a plurality of regions are extracted in the extraction, a high importance level is set for a large region or a region including a central part of the first image.

Whether or not an extracted region is adopted as an object common to the image group is judged based on a distance from the extracted region to an image end of the first image.

Other Embodiment

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2013-047134 filed Mar. 8, 2013 and 2014-023771 filed Feb. 10, 2014 which are hereby incorporated by reference herein in their entirety.

What is claimed is:

1. An image processing apparatus comprising:
a calculation unit configured to detect feature points from an image included in a first image group, and to calculate a local feature amount of each feature point using pixels adjacent to the feature point;
a comparison unit configured to determine similarity between images based on local feature amounts of the detected feature points for each combination of images included in the first image group;
a separation unit configured to separate an image, which is included in the first image group and corresponds to the combination having the similarity not less than a first threshold, as an image of a second image group;
a selection unit configured to select a reference image from the second image group based on the similarity of images of the second image group;
a detection unit configured to detect, for each feature point of the reference image, a number of images included in the second image group, each of which has a feature point corresponding to the feature point of the reference image, as a number of corresponding images; and
an estimation unit configured to estimate an object region based on a distribution of feature points, each of which has the number of corresponding images exceeding a second threshold, in the reference image,
wherein at least one of the calculation unit, the comparison unit, the separation unit, the selection unit, the detection unit, or the estimation unit is implemented by using a processor.

2. The apparatus according to claim 1, wherein the image processing apparatus is configured to detect a subject common to a plurality of images.

3. The apparatus according to claim 1, wherein the calculation unit calculates a local feature amount having a rotation invariance and a scaling invariance for the feature point.

4. The apparatus according to claim 1, wherein the comparison unit generates a corresponding point list, which indicates pairs of corresponding feature points between a first image and a second image, based on differences of the local feature amounts for each combination of the images, and
the comparison unit calculates a distance between the corresponding feature points forming a pair contained in the corresponding list, and determines, as the similarity, a number of pairs of corresponding feature points, each of which has the distance equal to or less than a third threshold.

5. The apparatus according to claim 4, wherein the comparison unit performs the steps of:
selecting two pairs of corresponding points from the corresponding point list;
calculating transformation matrices from coordinates of the two pairs of corresponding feature points;
selecting a pair of corresponding feature points, which is different from the two pairs of corresponding points, from the corresponding point list;
transforming coordinates of a feature point of the second image of the pair of corresponding feature points into coordinates on the first image using the transformation matrices; and
calculating a distance between coordinates of a feature point of the first image of the pair of corresponding feature points and the coordinates of the transformed feature point as the distance between the corresponding feature points.

6. The apparatus according to claim 4, wherein the comparison unit generates a proximity corresponding point list indicating pairs of corresponding feature points, and
the distance between the corresponding feature points forming each pair included in the proximity corresponding point list is not more than the third threshold.

7. The apparatus according to claim 6, wherein the detection unit detects the numbers of corresponding images based on the proximity corresponding point list.

8. The apparatus according to claim 1, wherein the selection unit selects, as the reference image, an image having a maximum value obtained by accumulating the similarity to other images in the second image group.

9. The apparatus according to claim 8, wherein the selection unit generates a third image group by deleting an image from the second image group, and wherein an image to be deleted from the second image group having a value less than a fourth threshold, the value being obtained by dividing the similarity accumulated value by the number of images included in the second image group.

10. The apparatus according to claim 9, wherein the estimation unit calculates a value obtained by multiplying a number of images included in the third image group by a predetermined ratio as the second threshold.

11. The apparatus according to claim 1, wherein the estimation unit estimates, as the object region, a region including feature points, each of which has the numbers of corresponding images exceeding the second threshold.

12. The apparatus according to claim 11, wherein the region including the feature points is a maximum circumscribed rectangle or a maximum circumscribed polygon of the feature points.

13. The apparatus according to claim 1, wherein the estimation unit calculates a value obtained by dividing the number of images included in the second image group by a number of images included in the first image group as an importance level of a subject corresponding to the object region.

14. The apparatus according to claim 9, wherein the estimation unit calculates a value obtained by dividing a number of images included in the third image group by a number of images included in the first image group as an importance level of a subject corresponding to the object region.

15. The apparatus according to claim 1, wherein the selection unit counts, for each image of the second image group, a number of other images of the second image group to which the similarity exceeds a fifth threshold, and selects an image of the second image group having the maximum counted number as the reference image.

16. The apparatus according to claim 15, wherein the selection unit generates a third image group by deleting an image from the second image group, and
wherein an image to be deleted from the second group has a value less than a sixth threshold, the value being obtained by dividing the counted number by the number of images included in the second image group.

17. The apparatus according to claim 1, wherein the estimation unit determines whether or not the detected object region is located at an acceptable position of the reference image, and the detection by the detection unit and the estimation by the estimation unit are repeated based on a determination result of the acceptable position.

18. The apparatus according to claim 17, wherein the determination of the acceptable position is performed based on a barycentric position of the object region and a distance from the object region to an image end of the reference image.

19. The apparatus according to claim 6, wherein the detection unit calculates a rotation angle of an object between the reference image and each image of the second image group, and excludes a pair of feature points which does not satisfy a condition based on the rotation angle from the proximity corresponding point list.

20. The apparatus according to claim 1, wherein an image of the object region cropped from the reference image is used as an icon of a folder which stores the images of the first image group.

21. An image processing method comprising:
using a processor to perform the steps of:
detecting feature points from an image included in a first image group;
calculating a local feature amount of each feature point using pixels adjacent to the feature point;
determining similarity between images based on local feature amounts of the detected feature points for each combination of images included in the first image group;
separating an image, which is included in the first image group and corresponds to the combination having the similarity not less than a first threshold, as an image of a second image group;
selecting a reference image from the second image group based on the similarity of images of the second image group;
detecting, for each feature point of the reference image, a number of images included in the second image group, each of which has a feature point corresponding to the feature point of the reference image, as a number of corresponding images; and
estimating an object region based on a distribution of feature points, each of which has the number of corresponding images exceeding a second threshold, in the reference image.

22. A non-transitory computer readable medium storing a computer-executable program for causing a computer to perform the image processing method according to claim 21.

* * * * *